(12) United States Patent
Yazaki et al.

(10) Patent No.: US 8,954,216 B2
(45) Date of Patent: Feb. 10, 2015

(54) WORK MACHINE AND COMPONENTS THEREOF

(71) Applicant: Mamiya-OP NEQUOS Co., Ltd., Saitama (JP)

(72) Inventors: Noboru Yazaki, Tokyo (JP); Susumu Sukagawa, Tokyo (JP); Kenichiro Igeta, Saitama (JP)

(73) Assignee: Mamiya-OP NEQUOS Co., Ltd., Saitama (JP)

( * ) Notice: Subject to any disclaimer, the term of this patent is extended or adjusted under 35 U.S.C. 154(b) by 50 days.

(21) Appl. No.: 13/828,461

(22) Filed: Mar. 14, 2013

(65) Prior Publication Data

US 2013/0282224 A1    Oct. 24, 2013

(30) Foreign Application Priority Data

Apr. 24, 2012 (JP) ................................. 2012-099261

(51) Int. Cl.
*A01D 33/08* (2006.01)
*G01C 21/00* (2006.01)

(52) U.S. Cl.
USPC .............................................. 701/24; 701/50

(58) Field of Classification Search
USPC ......................................... 701/24, 50, 25, 23
See application file for complete search history.

(56) References Cited

U.S. PATENT DOCUMENTS

| | | | | |
|---|---|---|---|---|
| 6,128,574 A | * | 10/2000 | Diekhans | 701/410 |
| 7,010,425 B2 | * | 3/2006 | Gray et al. | 701/425 |
| 8,498,788 B2 | * | 7/2013 | Kondekar | 701/50 |

FOREIGN PATENT DOCUMENTS

| | | |
|---|---|---|
| JP | 0937610 A | 2/1997 |
| JP | 2001344017 A | 12/2001 |

* cited by examiner

*Primary Examiner* — Tan Q Nguyen
(74) *Attorney, Agent, or Firm* — Matthew B. Dernier, Esq.; Gibson & Dernier LLP

(57) ABSTRACT

To provide a work machine that can make minimum passes over a target area without leaving any tasks with flexible steering operations. A controller 10 mounted on a motor-driven lawn mower 1 determines intersections between a contour service path and a pair of straight service paths that are adjacent to each other in which the motor-driven lawn mower 1 travels along the straight service paths in opposite directions, and sets (records) a turning behavior including backward movement of the motor-driven lawn mower connecting the adjacent intersections in a configuration file. The information recorded in the configuration file is read during the operation to move the motor-driven lawn mower along the contour service path 50 and the straight service paths on anywhere other than the aforementioned intersections and to turn in accordance with the turning behavior when the motor-driven lawn mower reaches one of the intersections.

13 Claims, 10 Drawing Sheets

WORK MACHINE AND COMPONENTS THEREOF

BACKGROUND OF THE INVENTION

1. Technical Field

The present invention relates to a work machine such as a motor-driven lawn mower or a sweeper used in fields or grounds such as golf fields and soccer grounds, banks of a river, parks and green, and gardens, and components thereof.

2. Background Art

Golf fields with two or more courses mow the lawn several times a year. Mowing putting green or fairway of a golf field is done by driving a lawn mower with an operator or by the remote control of it on which wired or wireless remote control device is mounted.

Golf fields have a large lawned area. In particular, putting green requires having proper lawn surface with equal height of the cut with high accuracy while avoiding any patches of grass left unmowed. With this regard, the operator typically observes the actual movement of the lawn mower with his or her eyes and controls a controller to determine an area or path to be mowed, when the lawn mower is controlled remotely. This means that the operator is bound to stay somewhere near the work area. In addition, when it is necessary to make several passes on the same point, no operation can be done exactly in a same way if the operation relies on the memory and feeling of the operator. These operations cannot be done during the night time because the lawn motor is not visible from the operator.

Automatic lawn mowing can save costs such as labor costs and improve the usability of the golf field when the lawn mowing is done during the night time.

For this kind of laborsaving, remote control devices are used. For example, an autonomous lawn mower disclosed in Japanese Patent Laid-Open No. 9-37610 comprises an autonomous navigation device and an electric navigation device. If the electric navigation device is not available, autonomous navigation is used for automatic operation. On the other hand, if the electric navigation device is available, the current point of location obtained by the autonomous navigation is corrected. Errors in angles detected by a sensor for sensing the orientation of the lawn mower are accumulated, so that the lawn mower is alternately rotated by an equal amount in both the right and left directions in order to avoid rotation of the lawn mower in one direction. This achieves more accurate automatic operation of the lawn mower.

A self-propelled machine (lawn mower) disclosed in Japanese Patent Laid-Open No. 2001-344017 uses a personal computer in an off-line mode to generate map data based on survey data obtained when the self-propelled machine travels in a work area. This map data is used to generate operation data and a traveling path in the work area within which the self-propelled machine is going to operate. If the work area has an uneven ground surface, a change in overlapped width due to the slope of the uneven ground surface is calculated and a gap between paths is generated with which the determined overlapped width can be achieved. As a result, even on the uneven ground surface, the paths are defined with different gaps between them depending on the angle of tilt, which contributes to avoiding any patches of grass left unmowed.

The lawn mower disclosed in Japanese Patent Laid-Open No. 9-37610 describes that errors in angles detected by the sensor for sensing the orientation of driving are not accumulated. This means that the accuracy of the angle detection can be improved. However, this lawn mower moves horizontally by an amount equal to a mowing width by means of steering the lawn mower in such a manner that the right steering angle becomes equal to the left steering angle only during the time when the lawn mower moves ahead. Backward movement of the lawn mower is not taken into consideration. In addition, a process of steering and a target area are limited due to the necessary steps of preventing accumulation of the angle detection errors, which restricts the flexibility of the operation. In addition, the lawn is mown always in a semi-circular shape at the start and end points of lawn mowing, with a possibility of leaving patches of grass unmowed.

On the contrary, the lawn mower disclosed in Japanese Patent Laid-Open No. 2001-344017 can avoid any patches of grass left unmowed. However, this lawn mower turns along a semi-circular path at the end of a straight service path. This means that it is impossible to mow the lawn along a path that is smaller than the minimum turning radius of the lawn mower regardless of the width of the cutting blade(s).

The aforementioned problems associated with the lawn mowers disclosed in Japanese Patent Laid-Open Nos. 9-37610 and 2001-344017 also occur in driving cultivating machines such as tractor for agricultural or farm works as well as driving of sweeper or cleaner robots.

An object of the present invention is to provide a work machine and components thereof with which a work path that the work machine follows, including backward movement and turns, can be defined, the work machine being moved through a minimum path in a flexible target area with flexible steering operation.

SUMMARY OF THE INVENTION

In order to solve the aforementioned problem, the present invention provides a work machine controller, a work machine, and a computer program.

(1) A work machine controller according to the present invention is a device having the following functions:

(1-1) detection means for detecting a behavior and a current position of a work machine that achieves a predetermined operation while moving a target area;

(1-2) service path defining means for defining a contour service path and a plurality of straight service paths, the contour service path running along the periphery of the target area, the straight service paths being defined by dividing the target area enclosed by the contour service path into two or more blocks with straight lines;

(1-3) turning behavior defining means for determining intersections between the contour service path and a pair of straight service paths, the pair of straight service paths being adjacent two of the straight service paths, the work machine being designed to travel along one of the pair of straight service paths in a first direction and travel along the other of the pair of straight service paths in a second direction that is opposite to the first direction, the turning behavior defining means defining a turning behavior including backward movement of the work machine along a path connecting the adjacent intersections; and (1-4) control means for producing a travel control signal to control a travel drive mechanism included in the work machine by using the travel control signal, the travel control signal being used to move the work machine along the contour service path and the straight service paths defined by the service path defining means on anywhere other than the intersections between the contour service path and the straight service paths, based on the behavior and current position of the work machine traveling in the target area and information about their changes, and to turn the work machine in accordance with the turning behavior defined by the turning behavior defining means when the work machine reaches one of the intersections.

(2) A work machine according to the present invention is a work machine that achieves a predetermined operation while moving a target area comprising a controller and a drive mechanism that is adapted to drive itself in response to a travel control signal produced from the controller. The controller has the following functions:

(2-1) detection means for detecting a behavior and a current position of the work machine;

(2-2) service path defining means for defining a contour service path and a plurality of straight service paths, the contour service path running along the periphery of the target area, the straight service paths being defined by dividing the target area enclosed by the contour service path into two or more blocks with straight lines;

(2-3) turning behavior defining means for determining intersections between the contour service path and a pair of straight service paths, the pair of straight service paths being adjacent two of the straight service paths, the work machine being designed to travel along one of the pair of straight service paths in a first direction and travel along the other of the pair of straight service paths in a second direction that is opposite to the first direction, the turning behavior defining means defining a turning behavior including backward movement of the work machine along a path connecting the adjacent intersections; and (2-4) control means for producing a travel control signal for traveling along the contour service path and the straight service paths defined by the service path defining means on anywhere other than the intersections between the contour service path and the straight service paths, based on the behavior and current position and information about their changes, and turning in accordance with the turning behavior defined by the turning behavior defining means when the work machine reaches one of the intersections.

(3) A computer program according to the present invention is a computer program for use in operating, as a controller, a computer system mounted on a work machine that achieves a predetermined operation while moving a target area, the computer program being adapted to make the computer system function as follows:

(3-1) detection means for detecting a behavior and a current position of the work machine;

(3-2) service path defining means for defining a contour service path and a plurality of straight service paths, the contour service path running along the periphery of the target area, the straight service paths being defined by dividing the target area enclosed by the contour service path into two or more blocks with straight lines;

(3-3) turning behavior defining means for determining intersections between the contour service path and a pair of straight service paths, the pair of straight service paths being adjacent two of the straight service paths, the work machine being designed to travel along one of the pair of straight service paths in a first direction and travel along the other of the pair of straight service paths in a second direction that is opposite to the first direction, the turning behavior defining means defining a turning behavior including backward movement of the work machine along a path connecting the adjacent intersections; and (3-4) control means for producing a travel control signal to control a travel drive mechanism included in the work machine by using the travel control signal, the travel control signal being used to move the work machine along the contour service path and the straight service paths defined by the service path defining means on anywhere other than the intersections between the contour service path and the straight service paths, based on the behavior and current position of the work machine traveling in the target area and information about their changes, and to turn the work machine in accordance with the turning behavior defined by the turning behavior defining means when the work machine reaches one of the intersections.

According to the present invention, turning behavior including backward movement connecting intersections between the contour service path and a pair of straight service paths is determined in which the pair of straight service paths are adjacent to each other and the work machine travels along the straight service paths in opposite directions. The work machine is controlled in such a manner that it travels along the contour service path and the straight service paths on anywhere other than the intersections between the contour service path and the straight service paths and turns in accordance with the turning behavior when the work machine reaches one of the intersections. Thus, it is possible to provide a work machine that can make minimum passes over a target area without leaving any tasks with flexible steering operations.

DETAILED DESCRIPTION OF THE INVENTION

Now, an embodiment is described in which a work machine according to the present invention is applied to a motor-driven lawn mower used in golf fields. Typical motor-driven lawnmowers are designed to mow lawn while moving ahead. Mowing the putting green or fairway (hereinafter, referred to as a place such as putting green) of a golf field requires a regular pattern of mowing to make the grain of the grass on the adjacent passes in the opposite directions. It is desired to cut a pass as smooth as possible on a border between the place such as putting green and the rough area. Taken this into consideration, the motor-driven lawn mower according to the present embodiment is described in terms of a case where the motor-driven lawn mower moves along a contour service path and straight service paths, in which the contour service path runs along the periphery of the place such as putting green to be mowed and the straight service paths are for making necessary passes to cover the place such as putting green. Lawn mowing in each path is described hereinbelow.

It should be noted that either one of the contour service path or the straight service paths may be cut first, but this embodiment describes a case where mowing in the straight service paths is followed by mowing in the contour service path.

[First Embodiment]

<Overview>

Figure 1:
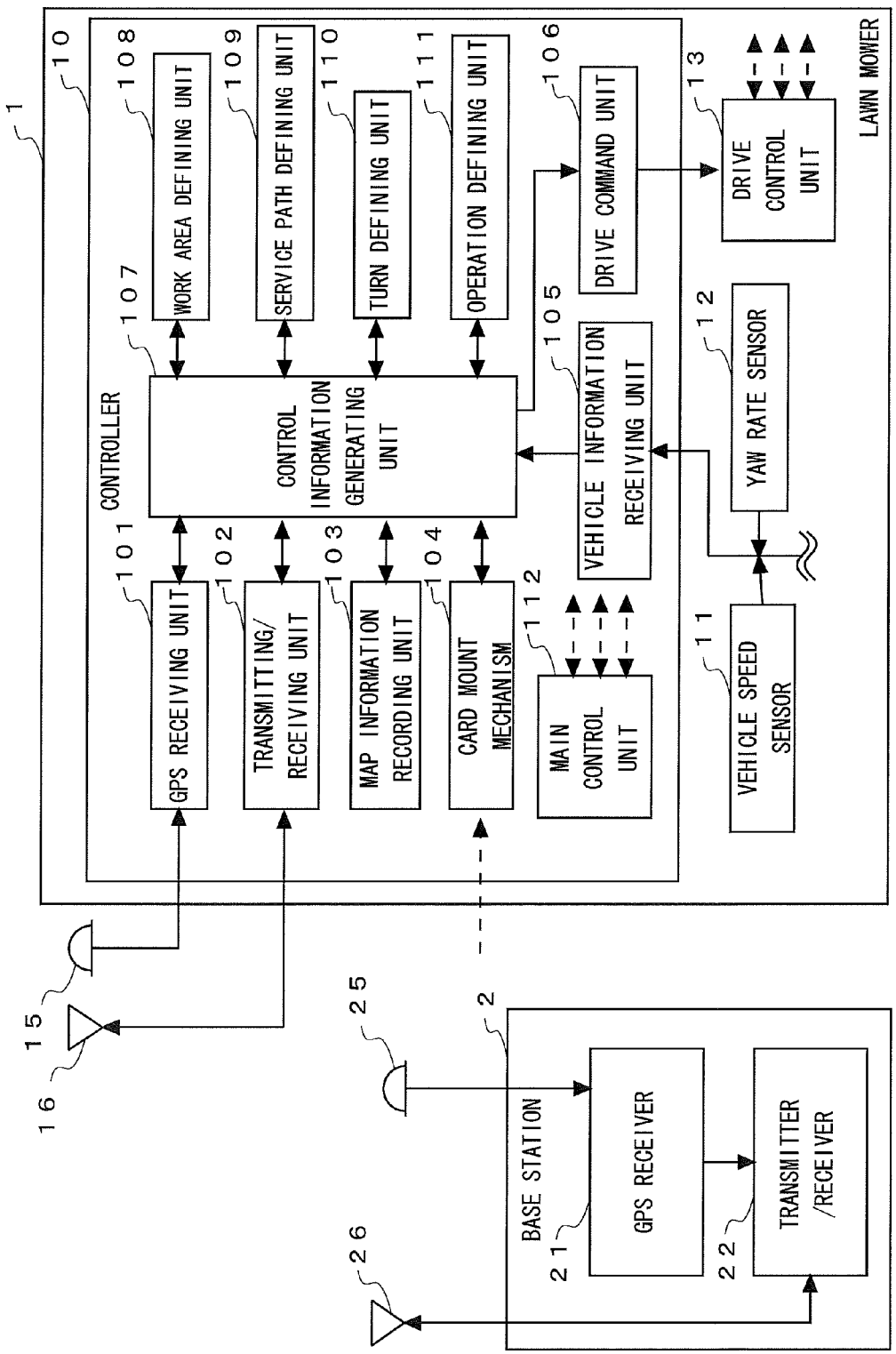
FIG. 1 is a block diagram schematically showing an entire configuration of devices required for lawn mowing.

FIG. 1 shows a block diagram of an entire configuration of devices required for lawn mowing. This embodiment illustrates a motor-driven lawn mower 1 that can mow the grass in a golf field while measuring a current position of the mower itself by using communication information and GPS data from a base station 2 using differential GPS.

The base station 2 serves as a reference station for the differential GPS and comprises a GPS receiver 21, a transmitter/receiver 22, a GPS antenna 25, and a communication antenna 26. The base station 2 is located at a point with known longitude, latitude, and altitude. The GPS receiver 21 generates correction information for use in correcting an error in position information indicating the position of the motor-driven lawn mower 1. This correction information is appropriately sent to the motor-driven lawn mower 1 through the transmitter/receiver 22 and the communication antenna 26. The timing of sending the correction information to the motor-driven lawn mower 1 may be, for example, when a request is received from the motor-driven lawn mower 1. Alternatively, the correction information may be sent at a predetermined interval such as every one minute.

The motor-driven lawn mower 1 comprises a controller 10, a vehicle speed sensor 11, a yaw rate sensor 12, a drive control unit 13, a GPS antenna 15, and a communication antenna 16.

The controller 10 is an example of a work machine controller according to the present invention. It is made up of a computer system with a communication function, a storage function (internal and external storage devices) and a display function (display) and a predetermined computer program. This computer program makes the computer system function as a GPS receiving unit 101, a transmitting/receiving unit 102, a map information recording unit 103, a card mount mechanism 104, a vehicle information receiving unit 105, a drive command unit 106, a control information generating unit 107, a work area defining unit 108, a service path defining unit 109, a turn defining unit 110, an operation defining unit 111, and a main control unit 112. The main control unit 112 controls the overall operation of each unit. This computer system has a real time clock (RTC) module that generates clock time data and synchronous clocks for ensuring the synchronization of the control operation. Details of the controller 10 are described later.

The vehicle speed sensor 11 detects the speed of the motor-driven lawn mower 1 when the motor-driven lawn mower 1 moves straight ahead or straight back. The yaw rate sensor 12 detects the angular velocity of the motor-driven lawn mower 1 around the mower axes (roll, pitch, yaw) in the three dimensional space to determine the behavior (motion) such as tilt, rotation, and swing of the motor-driven lawn mower 1. An accelerometer may be used in place of the yaw rate sensor 12 to take necessary data. Alternatively, measurements of some instruments contained in the motor-driven lawn mower 1 may be used and the sensors 11 and 12 may be omitted.

The drive control unit 13 controls a work drive mechanism that moves cutter blades of the motor-driven lawn mower 1 according to a work control signal described later. The drive control unit 13 also controls a travel drive mechanism that moves the motor-driven lawn mower 1 straight ahead or straight back, and turns it right or left according to a travel control signal described later. The drive control unit 13 may be provided separately from the controller 10 as shown in the figure. Alternatively, the drive control unit 13 may be provided as a part of a function of the controller 10.

The GPS antenna 15 serves as a position detection sensor that receives GPS data transmitted from the GPS antenna 25 of the base station 2. The communication antenna 16 allows communication with the communication antenna 26 of the base station 2. This communication is used for communication with an operator of the motor-driven lawn mower 1 or for transmitting signals for remote control of the motor-driven lawn mower 1.

<Lawn Mower>

Figure 2A:
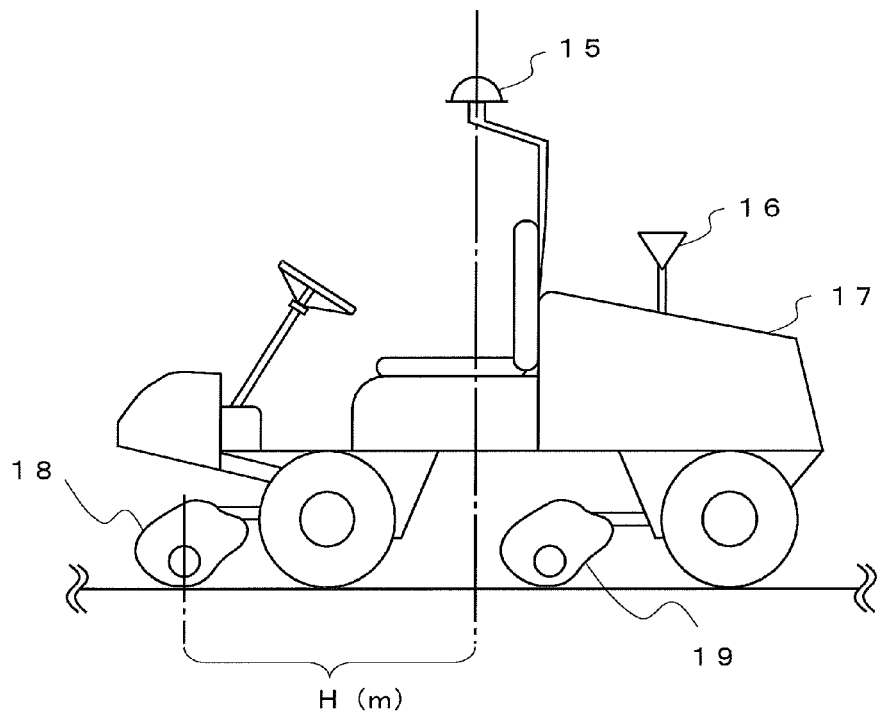
FIGS. 2A and 2B are side and top views, respectively, of a motor-driven lawn mower to which the present invention is applied.
Figure 2B:
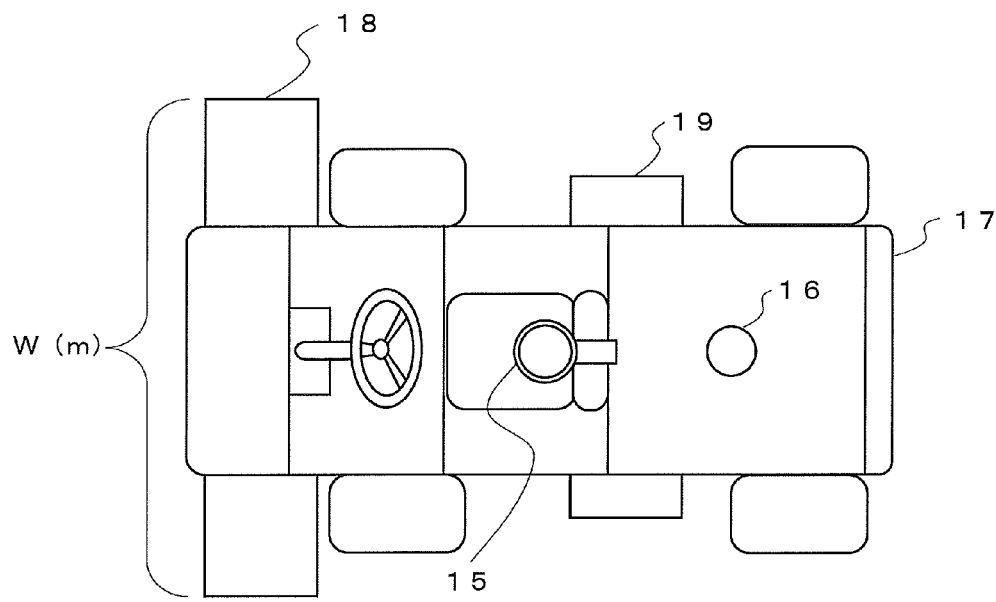

FIGS. 2A and 2B show appearances of the motor-driven lawn mower 1. FIG. 2A is a side view of the motor-driven lawn mower 1 while FIG. 2B is a top view thereof. The aforementioned controller 10, the vehicle speed sensor 11, the yaw rate sensor 12, the drive control unit 13, as well as the travel drive mechanism and the work drive mechanism are housed within the body of the motor-driven lawn mower 1.

The yaw rate sensor 12 is mounted at a position where information about the behavior of the motor-driven lawn mower 1 can be transmitted correctly and appropriately. The GPS antenna 15 is provided around the center of the body of the motor-driven lawn mower 1, that is, at or near the intersection between the centers of the longitudinal and lateral axes of the body. The communication antenna 16 is projected from a rear surface of the body of the motor-driven lawn mower 1.

The motor-driven lawn mower 1 has a pair of cutter blades 18, 19 for cutting lawn and turf. The front cutter blade 18 cuts the grass along the longitudinal edges of the service path, at both ends of a work width W[m] that crosses the moving direction of the motor-driven lawn mower 1 at right angles. The rear cutter blade 19 cuts the grass at the central portion of the service path in the work width W[m]. This work width W[m] corresponds to a work width within which the grass can be mowed by moving the motor-driven lawn mower 1 along a single service path. A reference point is given to define a margin of the lawn mowing with the motor-driven lawn mower 1. The reference point is located at a position where the cutting blade 18 contacts the ground surface, in which the position is away from the intersection between the normal line passing the GPS antenna 15 and the ground surface by a distance H[m].

<Controller>

Referring back to FIG. 1, the GPS receiving unit 101 of the controller 10 sends the position information that indicates the current position of the motor-driven lawn mower 1 to the control information generating unit 107, according to the GPS data received by the GPS antenna 15. The transmitting/receiving unit 102 allows communication between the control information generating unit 107 and the base station 2 through the communication antenna 16.

The map information recording unit 103 has a map in a configuration file for a predetermined recording device that the computer system can access to read the contents. The map represents geometric or geographical features (including a shape, tilt, and peripheral structures) of a golf field within which the motor-driven lawn mower 1 is going to be used for lawn mowing. The map information recording unit 103 reads the map as needed so that the map can be referred to in order to determine the exact position information when a travel control signal and a work control signal are generated. The travel control signal is for controlling the travel of the motor-driven lawn mower 1. The work control signal is for controlling the lawn mowing operation. A well-known technique that is called map matching may be used to refer to the position information based on the map.

The card mount mechanism 104 can receive and eject an IC card on which information is recorded such as information about the authority of an operator who drives the motor-driven lawn mower 1 or controls it remotely. The card mount mechanism 104 reads the information recorded on the IC card or writes information on the IC card when the IC card is mounted thereon.

The vehicle information receiving unit 105 receives sense information from the vehicle speed sensor 11 and the yaw rate sensor 12. The sense information represents the speed, orientation, and behavior of the motor-driven lawnmower 1. When the received information is in analog data format, it is converted into digital data before being transmitted to the control information generating unit 107. The data may be corrected, if necessary, by means of removing offset and drift in the output of the yaw rate sensor 12. The information about the output of the vehicle information receiving unit 105 is associated with the data indicating the current time and recorded on a non-volatile memory (buffer) which is not shown. It is preferable that the buffer be a ring buffer in which the pointer that determines where to write wraps back to the lowest address after writing to the highest address, forming a ring. However, the buffer used is not limited to such a kind of buffer. A part or all of the information recorded on the buffer is also recorded on the IC card mounted on the card mount mechanism 104 through the main control unit 112.

The drive command unit 106 supplies information related to the control of the travel drive mechanism or the work drive mechanism to the drive control unit 13 according to the information about the output of the control information generating unit 107 (travel control signal/work control signal) to control the travel or the operation of the motor-driven lawn mower 1. The drive control unit 13 controls the travel drive mechanism or the travel drive mechanism of the motor-driven lawn mower 1 based on this information. This allows lawn mowing operation by the motor-driven lawn mower 1.

The control information generating unit 107 generates the travel control signal and the work control signal in cooperation with the work area defining unit 108, the service path defining unit 109, the turn defining unit 110, and the operation defining unit 111. To this end, the control information generating unit 107 uses the geographical features and attribute information including the body size of the motor-driven lawn mower 1, the work width, and a shape of a curved line path followed by the motor-driven lawn mower 1 when it turns. The attribute information and the geographical features are previously recorded on a recording device that the main control unit 112 can access to read the contents.

The work area defining unit 108 and the service path defining unit 109 serve as service path defining means while the turn defining unit 110 serves as turning behavior defining means. They allow the mower to propel itself by means of associating the settings with a map of a golf course to be mowed, recording them in a configuration file that is read during the mowing operation, and producing the travel control signal or the work control signal based on the recorded information read from the configuration file at the beginning of the mowing operation in the golf course as well as the current position obtained by using the GPS data and the output of the sensors.

Figure 3A:
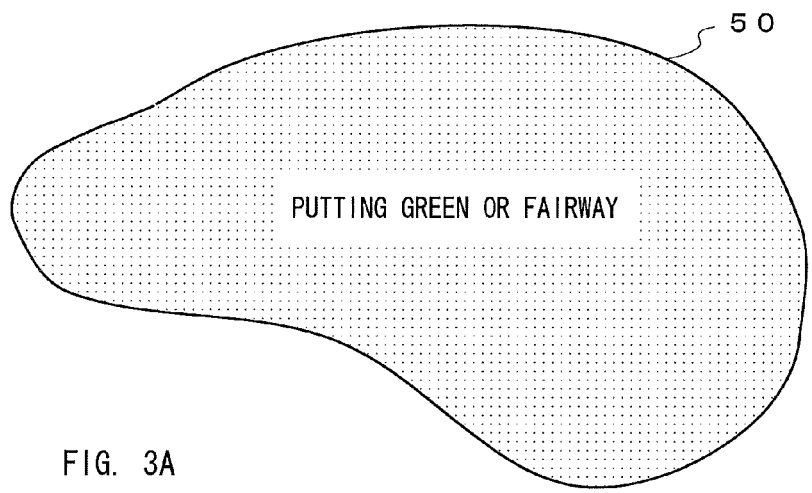
FIG. 3A is a view illustrating definition of a target area and a contour service path in a case of a golf field.
Figure 3B:
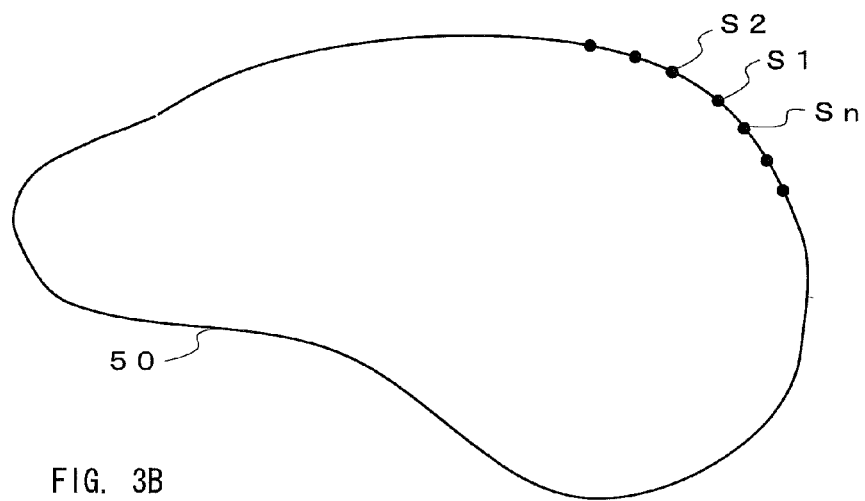
FIG. 3B is a view for use in describing intersections.

The work area defining unit 108 defines an outer edge of the area to be mowed by the motor-driven lawn mower 1. In this embodiment, a contour service path 50 is set (recorded) in a configuration file for each golf course of the golf field. As shown in FIG. 3A, the contour service path 50 corresponds to a border between a place such as putting green to be mowed and a rough area that is not mowed. The contour service path 50 is a time series collection of position information obtained from the GPS data during a test drive along the edge of the area to be mowed by the motor-driven lawn mower 1, or based on, for example, a pre-recorded map (including geographical features, presence or absence of an obstacle, and tilt) of the place such as putting green. As shown in FIG. 3B, the contour service path 50 can be represented by coordinate points S1, S2, . . . , Sn.

The adjacent coordinate points of the contour service path 50 are connected to each other and set (recorded) in the configuration file. It should be noted that the actual border between the place such as putting green and the rough area lies outside the contour service path 50 by a distance W/2[m] when the mowing width W of the cutter blade 18 is taken into consideration. However, the border is indicated along the contour service path 50 for the purpose of simplification in this embodiment. The coordinate point S1 may be positioned at any point on the contour service path 50.

The work area defining unit 108 calculates the border as a collection of the points located along a line that is away from the contour service path 50 in an outward or inward direction by a distance equal to the work width in order to adjust the border between the place such as putting green and the rough area more precisely. In such a case, the calculated border may be used as a new contour service path. This makes it possible to define any border between the place such as putting green and the rough area depending on, for example, the season or how the lawn grass is growing, without an additional test drive of the motor-driven lawn mower 1 along the place such as putting green.

Figure 3C:
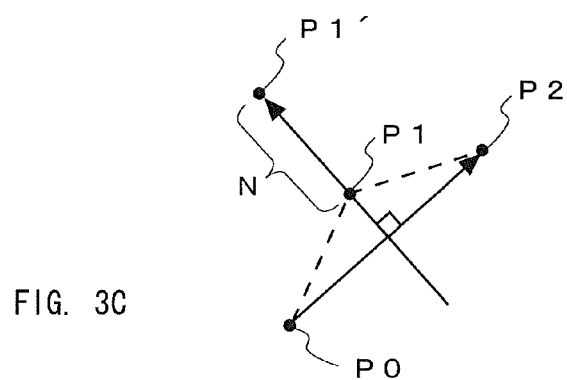
FIG. 3C is a view for use in describing how to enlarge an area enclosed by a contour service path.

For example, as shown in FIG. 3C, a new coordinate point P1' is calculated. The coordinate point P1' lies on a line segment that is perpendicular to a vector [P0, P2] of a series of coordinate points P0, P1, P2 on the contour service path 50 and that passes through the coordinate point P1 in the direction away from the place such as putting green. In addition, the coordinate point P1' is away from the coordinate point P1 by a distance N[m]. A new contour service path can be defined by means of calculating new coordinate points (such as the coordinate point P1') for all of the original coordinate points making the contour service path 50.

The service path defining unit 109 defines straight service paths based on the contour service path 50. The service path defining unit 109 also defines bridge line path which is described later. In other words, the service path defining unit 109 sets (records) service paths along which the motor-driven lawn mower 1 is to be moved in the configuration file.

Figure 4A:
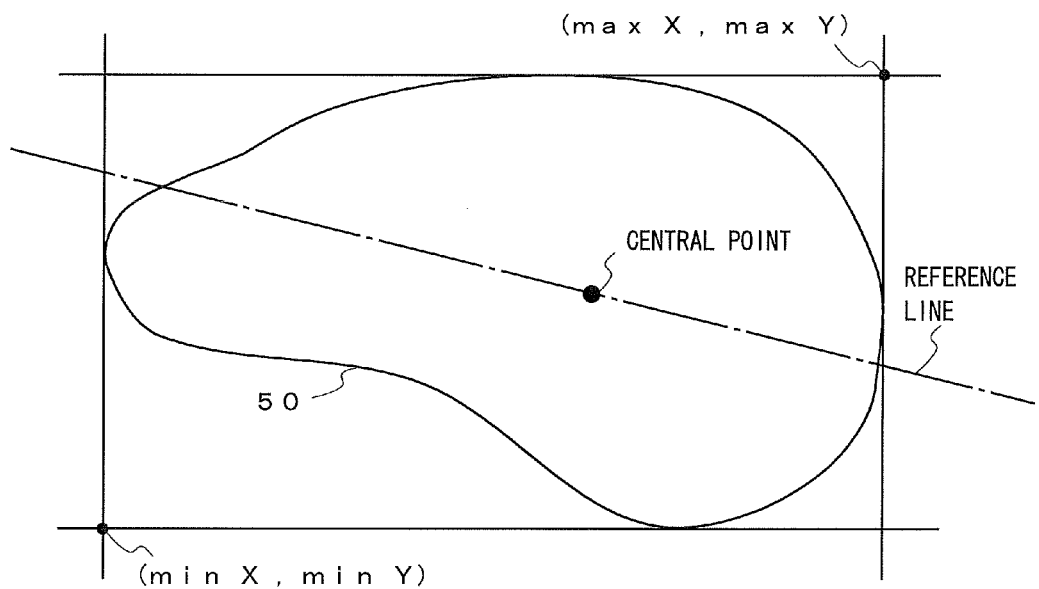
FIG. 4A is a view illustrating how to define a reference line.

In order to define the straight service paths, the contour service path 50 is projected on an XY coordinate plane as shown in FIG. 4A. Then, the coordinates (max X, max Y)of a maximum coordinate point is given at an intersection between a line segment passing through maximum X values and perpendicular to the X axis (not shown) and a line segment passing through maximum Y values and perpendicular to the Y axis (not shown). Likewise, the coordinates (min X, min Y)of a minimum coordinate point is given at an intersection between a line segment passing through minimum X values and perpendicular to the X axis (not shown) and a line segment passing through minimum Y values and perpendicular to the Y axis (not shown).

In addition, a span between the minimum value (min X) and the maximum value (max X) on the X coordinate points and a span between the minimum value (min Y) and the maximum value (max Y) on the Y coordinate points are shifted by an amount equal to a predetermined parameter (e.g., 0.1) to calculate a midpoint of a line segment crossing the contour service path 50. An average of the collection of such midpoints is used as a central point of the contour service path 50. Moreover, a regression line calculated by fitting a simple regression to the collection of the midpoints using, for example, least squares is used as a reference line for the contour service path 50.

In order to define the straight service paths, intersections are given between the contour service path 50 and straight lines (including the reference line) that are parallel to the reference line and are away from each other at a predetermined distance such as a distance equal to a value obtained by subtracting an amount of mowing overlap from the mowing width W[m]. Line segments connecting the opposite intersections are considered as the straight service paths. The adjacent coordinate points of the contour service path 50 are connected to each other through the line segments as a collection of these line segments.

Figure 4B:
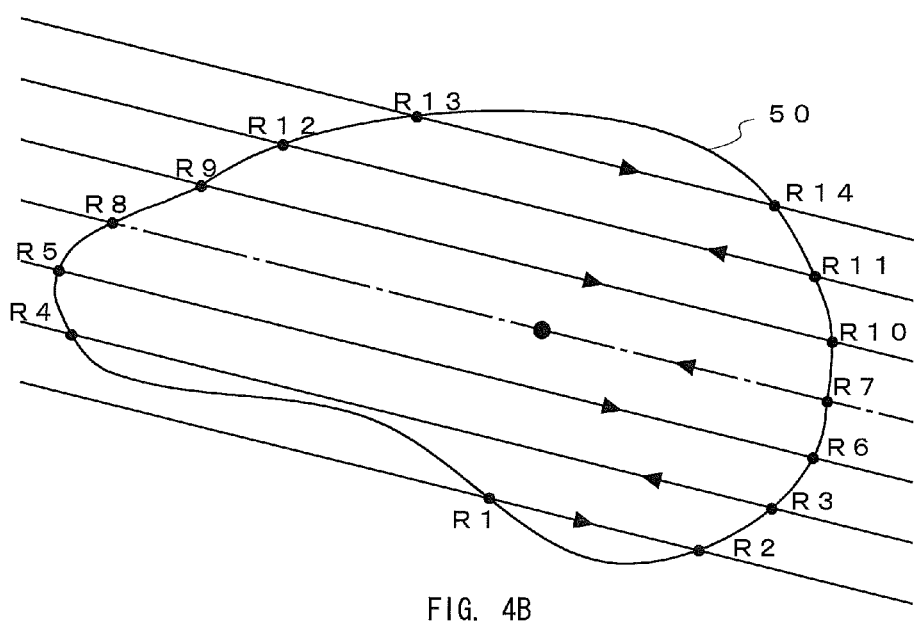
FIG. 4B is a view illustrating how to define straight service paths according to the reference line.

For example, as shown in FIG. 4B, of the intersections where the straight service paths meet the contour service path 50 that is a collection of the line segments, the lowest left intersection (coordinate point) relative to the reference line is represented by R1. The intersection (coordinate point) opposite to the intersection (coordinate point) R1 is represented by R2. The intersection (coordinate point) adjacent to the intersection (coordinate point) R2 in the counter-clockwise direction is represented by R3. The intersection (coordinate point) opposite to the intersection (coordinate point) R3 is represented by R4. Likewise, the intersections (coordinate points) R5 to R14 are given in number order. A procedure to give numbers to the intersections (coordinate points) starting from 1 is referred to as labeling, and the numbers are referred to as labels. The order of the labels corresponds to the order of the intersections (coordinate points) with the contour service path 50 that the motor-driven lawn mower 1 passes through when it moves along the straight service paths.

More specifically, the motor-driven lawn mower 1 travels from the intersection (coordinate point) R1 to the intersection (coordinate point) R2 along the straight service path. Then, the motor-driven lawn mower 1 travels from the intersection (coordinate point) R3 to the intersection (coordinate point) R4 in the reverse direction along the straight service path. The same applies to the intersections (coordinate points) R5 and the remainders.

Figure 5A:
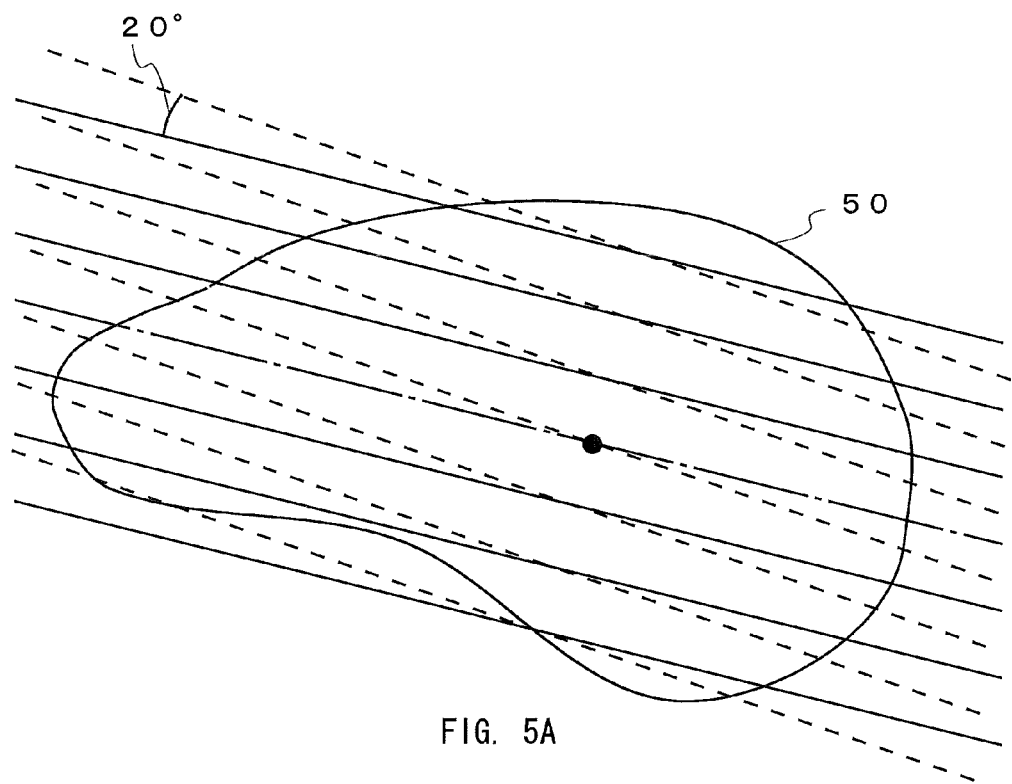
FIGS. 5A and 5B are views for use in describing adjustment of the straight service paths.

When the straight service paths are defined, the service path defining unit 109 may select such straight service paths that meet the contour service path 50 after inclining all straight service paths by any angle (e.g., 20 degrees in the example shown in FIG. 5A) within a range of from −90 degrees to +90 degrees relative to the reference line of which slope is considered to be 0 degrees relative to a horizontal line. Defining all straight service paths inclined makes it possible to provide lawn mowing while taking into consideration a predetermined line pattern or any change in growth of lawn grass depending on seasons.

It should be noted that the value of the slope (angle) may be determined so that the number of the straight service paths becomes minimum, that is, the number of the intersections between the straight service paths and the contour service path 50 becomes minimum.

Figure 5B:
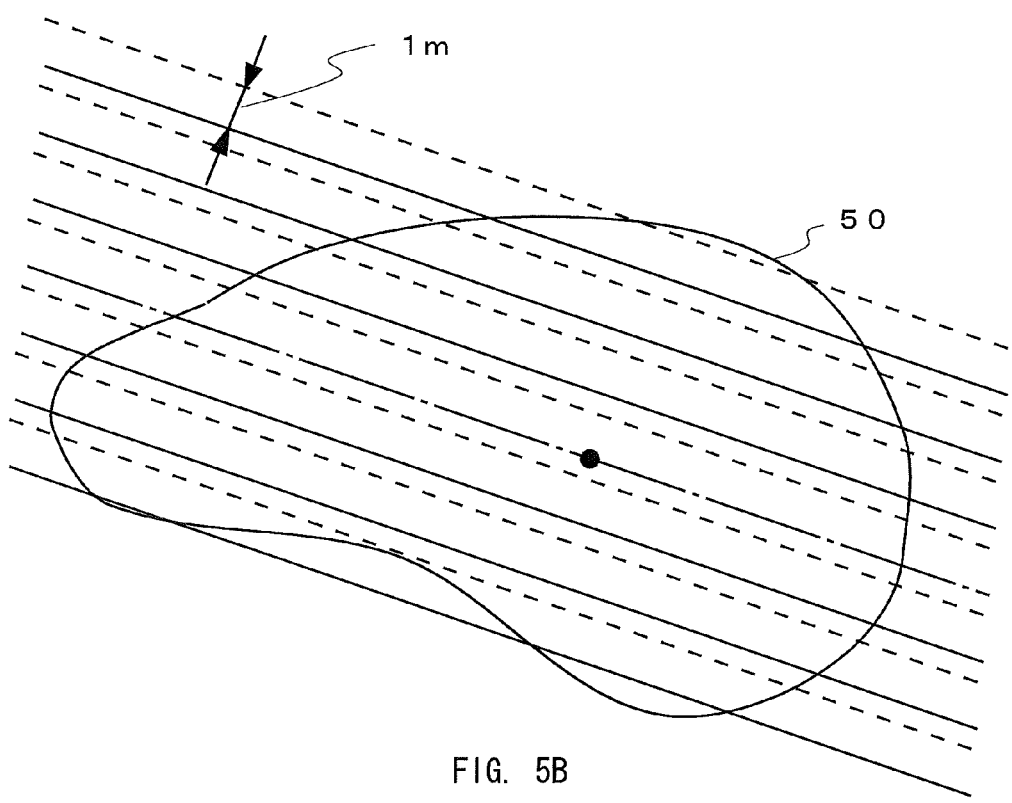

The service path defining unit 109 may select such straight service paths that meet the contour service path 50 after shifting all straight service paths by an amount equal to a predetermined margin size (1[m] in the example shown in FIG. 5B) in a direction perpendicular to the reference line. For example, the straight service paths may be defined so that the number of the straight service paths becomes minimum, that is, the number of the intersections between the straight service paths and the contour service path 50 becomes minimum.

The turn defining unit 110 sets (records) a turning behavior of the motor-driven lawn mower 1 in the configuration file according to the geographical features and the attribute information including the body size of the motor-driven lawn mower 1, the work width, and a curved line path followed by the motor-driven lawn mower 1 when it turns (which are recorded previously). The turning behavior as used herein refers to how the motor-driven lawn mower 1 that has traveled along a straight service path (first straight service path) turns to the adjacent straight service path (second straight service path).

Figure 6A:
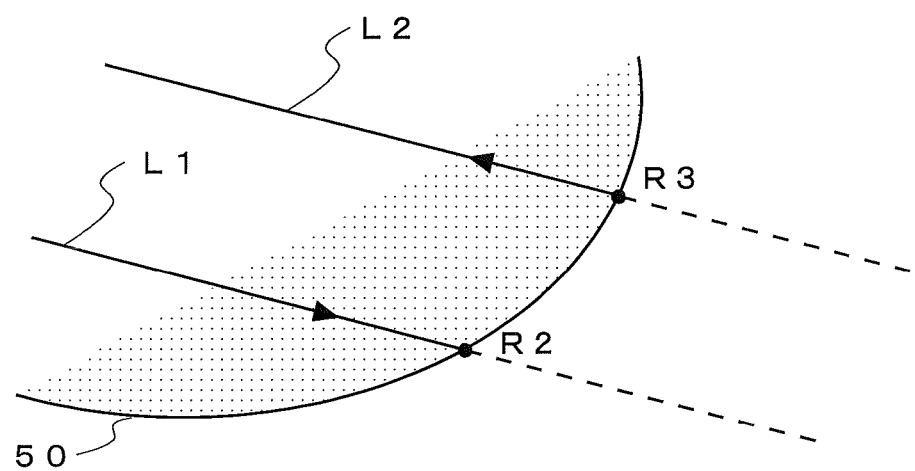
FIGS. 6A and 6B are views illustrating exemplified turning behaviors of the motor-driven lawn mower.

FIG. 6A shows an example of a turning behavior of the motor-driven lawn mower 1 when it reaches the intersection (coordinate point) R2 after mowing the lawn along a straight service path L1 and moves to a next straight service path L2 to mow the lawn starting from the intersection (coordinate point) R3.

Figure 6B:
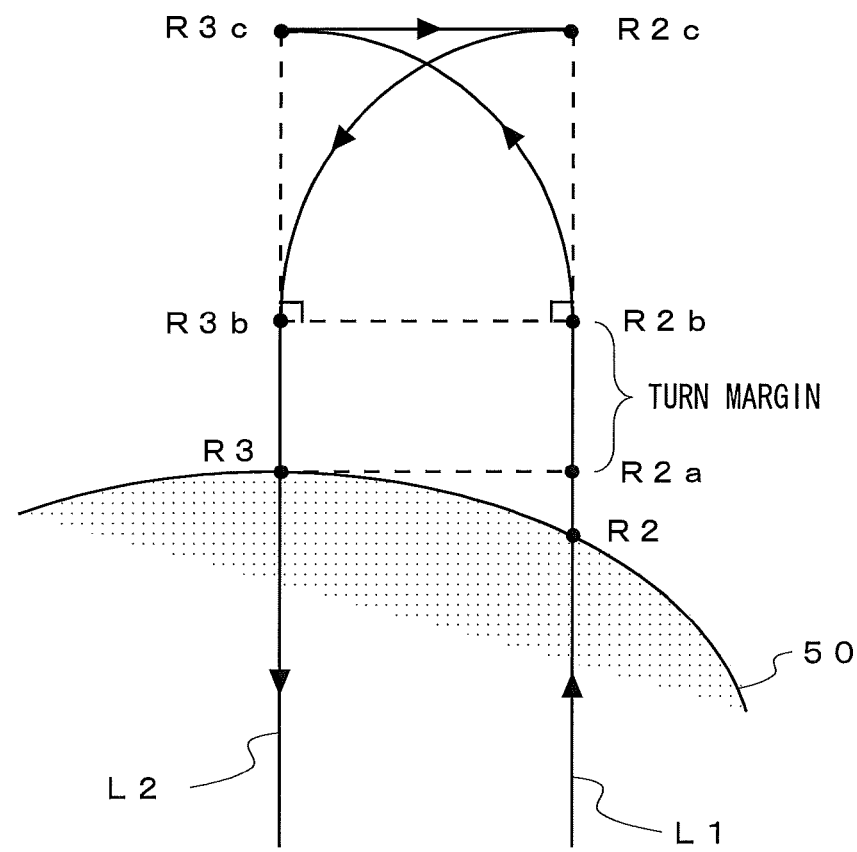

FIG. 6B shows a trajectory pattern of the motor-driven lawn mower 1 that it follows when it turns as shown in FIG. 6A. The turn defining unit 110 defines coordinate points (positions) R2b, R3c, R2c, R3b, and R3. The coordinate point R2b is a start position at which the motor-driven lawn mower 1 begins to turn ahead on the left (counter-clockwise) along a curved line path corresponding to an arc of a circle. More specifically, the motor-driven lawn mower 1 that has passed through an intersection (position) coordinate point R2 between the straight service path L1 and the contour service path 50 turns at the coordinate point R2b toward an extended line from the straight service path L2. The coordinate point R3c is a position where the motor-driven lawn mower 1 traveling along the arc meets or reaches the extended line from the straight service path L2. The coordinate point R2c is a position where an extended line from the straight service path L1 meets a straight line path that the motor-driven lawn mower 1 follows when it moves straight back from the coordinate point (position) R3c in the direction perpendicular to the straight service path L2. The coordinate point R3b is a position where the extended line from the straight service path L2 is connected to an arc that the motor-driven lawn mower 1 follows when it turns ahead on the left from the coordinate point R2c toward the straight service path L2. The coordinate point R3 is a position through which the motor-driven lawn mower 1 passes when it travels toward the straight service path L2 from the coordinate point R3b. The turning behavior of the type described is herein referred to as a "switch back" behavior.

This switch back contributes to significantly reducing the travel distance of the motor-driven lawn mower 1 as compared with conventional motor-driven lawnmowers (such as those disclosed in Japanese Patent Laid-Open Nos. 9-37610 and 2001-344017) traveling along a line path with a length equivalent to a semicircular arc after it reaches the end of a straight service path and then returns in the opposite direction.

In the switch back operation, each of the line segment connecting the coordinate points R3c and R2c and the line segment connecting the coordinate points R3b and R2b extends in the direction perpendicular to the straight service paths L1 and L2. The arc is an arc of 90 degrees, or one quarter of a circle whose center is at the coordinate point R2b or R3b and whose radius coincides with the straight line segment between the coordinate points R3b and R2b. The distance between a coordinate point (position) R2a and the coordinate point (position) R2b is herein referred to as a "turn margin". The coordinate point R2a is at the position where a straight line segment extending from the coordinate point R3 in the direction perpendicular to the straight service path L2 meets the extended line from the straight service path L1. The turn margin corresponds to the distance H[m] in FIG. 2A. This turn margin prevents any patches of grass from being left unmowed after the switch back of the motor-driven lawn mower 1 which otherwise occurs when the motor-driven lawn mower 1 begins lawn mowing at a point between the opposite ends of the straight service path L1 or L2. It should be noted that the turn margin may be larger than the distance H[m].

According to the coordinate points (positions) defined by the turn defining unit 110, the control information generating unit 107 generates the travel control signal and the work control signal. The travel control signal is for determining a course through which the motor-driven lawn mower 1 is going to travel. The work control signal is for determining when the cutter blade 18, 19 should be raised during the travel of the motor-driven lawn mower 1. For example, the travel control signal and the work control signal in the aforementioned switch back are as follows.

When the motor-driven lawn mower 1 reaches the coordinate point R2 after mowing the lawn along the straight service path L1, the cutter blades 18, 19 are raised (lifted up) from the ground in response to the work control signal. The motor-driven lawn mower 1 is moved ahead to the coordinate point R2b in response to the travel control signal. Subsequently, the motor-driven lawn mower 1 is turned ahead on the left from the coordinate point R2b to the coordinate point R3c along the arc of one quarter of a circle with a minimum turning radius. The motor-driven lawn mower 1 is moved straight back from the coordinate point (position) R3c to the coordinate point R2c. The motor-driven lawn mower 1 then turns ahead on the left from the coordinate point R2c to the coordinate point R3b along the arc of one quarter of a circle with a minimum turning radius. The turning of the motor-driven lawn mower 1 is thus completed. Thereafter, the cutter blades 18, 19 are lowered (contacted to the ground) at the intersection (coordinate point) R3 in response to the work control signal to make the motor-driven lawn mower 1 mow the lawn while moving along the straight service path L2.

While the aforementioned embodiment describes an example where the motor-driven lawn mower 1 moves to the straight service path L2 after mowing the lawn along the straight service path L1, a similar procedure can be used when, for example, the motor-driven lawn mower 1 moves from the straight service path L2 to the straight service path L1 (which can also be considered as the switch back).

Figure 7A:
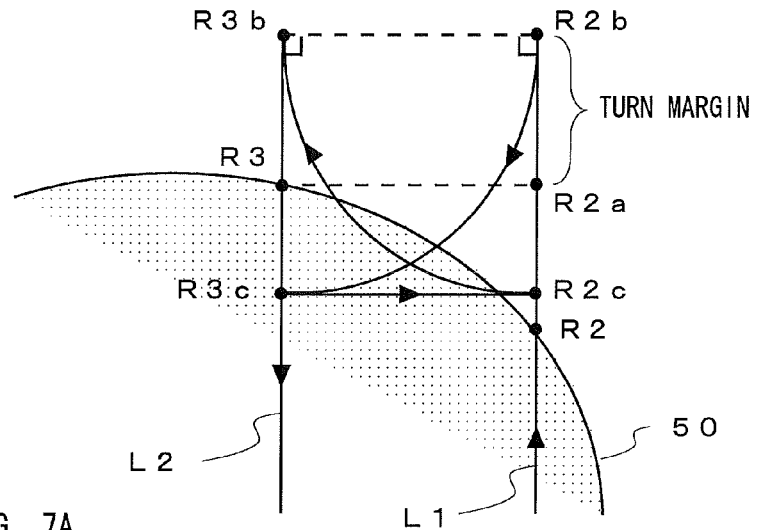
FIGS. 7A and 7B are views illustrating other turning behaviors.
Figure 7B:
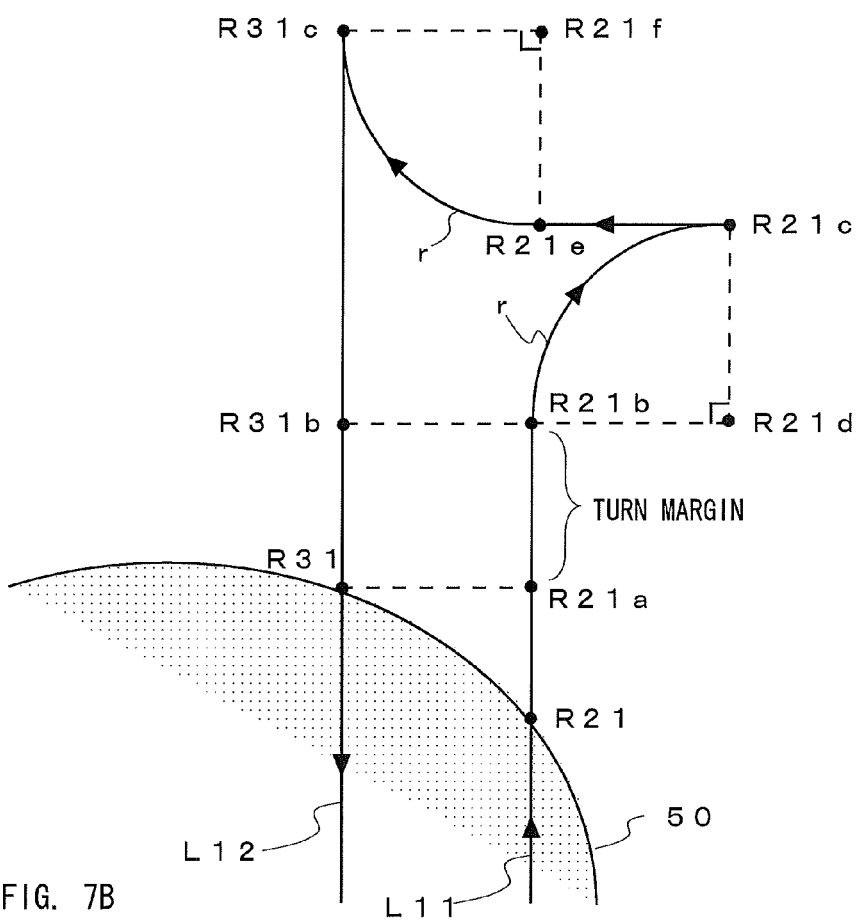

Another example of the turning behavior defined by the turn defining unit 110 is shown in FIGS. 7A and 7B. The difference between the turning behavior in FIG. 7A and the switch back behavior in FIG. 6B lies in the direction in which the motor-driven lawn mower 1 turns. More specifically, the motor-driven lawn mower 1 turns ahead on the left in the switch back while the motor-driven lawn mower 1 is set to turn back on the right (clockwise) in the turning behavior shown in FIG. 7A. This turning behavior is herein referred to as "reverse switchback" behavior. For the purpose of simplification, the coordinate points R2 and R3 where the straight service paths L1 and L2 meet the contour service path 50, respectively, are same as those shown for the case of the switch back in FIG. 6B.

The turn defining unit 110 defines coordinate points (positions) R2b, R3c, R2c, and R3b. The coordinate point R2b is a start position at which the motor-driven lawn mower 1 begins to turn on the extended line from the straight service path L1 after it has passed through the intersection (coordinate point) R2. The coordinate point R3c is a position where an arc followed by the motor-driven lawn mower 1 meets the straight service path L2. The coordinate point R2c is a position where a straight line path that the motor-driven lawn mower 1 follows when it moves straight ahead from the coordinate point (position) R3c in the direction perpendicular to the straight service path L2 meets the extended line from the straight service path L1. The coordinate point R3b is a position where an arc followed by the motor-driven lawn mower 1 meets the extended line from the straight service path L2 after the motor-driven lawn mower 1 travels back from the coordinate point R2c. The turning behavior of the type described is herein referred to as the "reverse switch back" behavior.

While the aforementioned embodiment describes an example where the motor-driven lawn mower 1 moves to the straight service path L2 after the lawn mowing along the straight service path L1, a similar procedure can be used when, for example, the motor-driven lawn mower 1 moves from the straight service path L2 to the straight service path L1.

This reverse switch back also contributes to significantly reducing the travel distance of the motor-driven lawn mower 1 as compared with conventional motor-driven lawn mowers (such as those disclosed in Japanese Patent Laid-Open Nos. 9-37610 and 2001-344017) traveling along a line path with a length equivalent to a semicircular arc after it reaches the end of a straight service path and then returns in the opposite direction. The reverse switch back is particularly useful when it is used in a golf field whose rough area is small or when there are obstacles such as trees and the like. The reverse switch back also allows the lawn mower 1 to realize the turning behavior in which even the turn margin is taken into consideration.

The turning behavior in FIG. 7B is different from the switch back and the reverse switch back behaviors in terms of the route and the number of times the motor-driven lawn mower 1 travels. In the turning behavior in FIG. 7B, the motor-driven lawn mower 1 travels along the straight service path L11, passes through the intersection between the straight service path L11 and the contour service path 50, i.e., the coordinate point R21, and then passes through a coordinate point R21a. Subsequently, the motor-driven lawn mower 1 travels straight ahead by a distance equal to the aforementioned turn margin and reaches a coordinate point R21b. This coordinate point R21b is a start point at which the motor-driven lawn mower 1 begins first turn (turn ahead on the right). A coordinate point R21c is calculated from the coordinate point R21b. The coordinate point R21c is at the end of the arc followed by the motor-driven lawn mower 1 with a minimum turning radius r. This arc corresponds to an arc of one quarter of a circle whose center is at a coordinate point R21d. The coordinate point R21d is at the intersection between a line passing through the coordinate point R21c in the direction parallel to the straight service path L11 and a line passing through the coordinate point R21b in the direction perpendicular to the straight service path L11. The coordinate point R21c is the endpoint of the first turning of the motor-driven lawn mower 1 and is defined as the start point at which the motor-driven lawn mower 1 begins to move back.

Next, a coordinate point R21e is calculated. The coordinate point R21e is located at a position where the straight line path followed by the motor-driven lawn mower 1 when it moves back from the coordinate point R2c toward the extended line from the straight service path L11 meets the extended line from the straight service path L11. This coordinate point R21e is defined as the start point of the second turning (turn back on the right). Then, a coordinate point R31c is calculated from the coordinate point R21e. The coordinate point R31c is at the end of the arc followed by the motor-driven lawn mower 1 when it turns back on the right with a minimum turning radius r. This arc corresponds to an arc of one quarter of a circle whose center is at a coordinate point R21f. The coordinate point R21f is located at the intersection between the extended line from the straight service path L11 passing through the coordinate point R21e and a straight line extending from the coordinate point R31c in the direction perpendicular to the straight service path L11.

The turning is completed at the coordinate point 31c and the motor-driven lawn mower 1 begins to travel ahead toward the straight service path L12. The motor-driven lawn mower 1 passes through the coordinate point R3b. It restarts the lawn mowing from the coordinate point R31 where the contour service path 50 meets the straight service path L12. The turning behavior of the type described is herein referred to as a "polarized turn" behavior.

While the aforementioned embodiment describes an example where the motor-driven lawn mower 1 moves to the straight service path L12 after mowing the lawn along the straight service path L11, a similar procedure can be used when, for example, the motor-driven lawn mower 1 moves from the straight service path L12 to the straight service path L11.

The polarized turn allows turning of the motor-driven lawn mower 1 within a smaller space even when there is not enough space between the adjacent straight service paths, as compared with the turning in which the motor-driven lawn mower 1 is turned with a minimum turning radius r.

The turn defining unit 110 can selectively defines one of the switch back, the reverse switch back, and the polarized turn behaviors. As a result, it is possible to provide flexible mowing services for various geometric configurations of golf courses to be mowed.

The operation defining unit 111 is for defining various operations related to lawn mowing, including an up-and-down operation of the cutter blades 18, 19 of the motor-driven lawn mower 1 during the time duration when it is traveling or stopped, and a start/stop operation to rotate and stop the cutter blades 18, 19. Now, referring to FIGS. 8A and 8B, description is made mainly in terms of how a cutter blade raising position and a cutter blade lowered position are determined, which are associated with the up-and-down operation of the cutter blades 18, 19.

The cutter blade raising position and the cutter blade lowered position are determined while taking into account the width of the cutter blades 18, 19 as well as the distance between a reference position for the position information indicating the position of the motor-driven lawn mower 1 and the position where the cutter blades 18, 19 of the motor-driven lawn mower 1 are contacted with the ground surface in the turn margin defined by the turn defining unit 110. More specifically, the cutter blades 18, 19 are contacted with and separated from the ground surface within a mowing width W (e.g., the width W[m] of the cutter blade 18) on the contour service path in order to prevent patches of grass being left unmowed or prevent the grass outside the work are from being mowed.

Figure 8A:
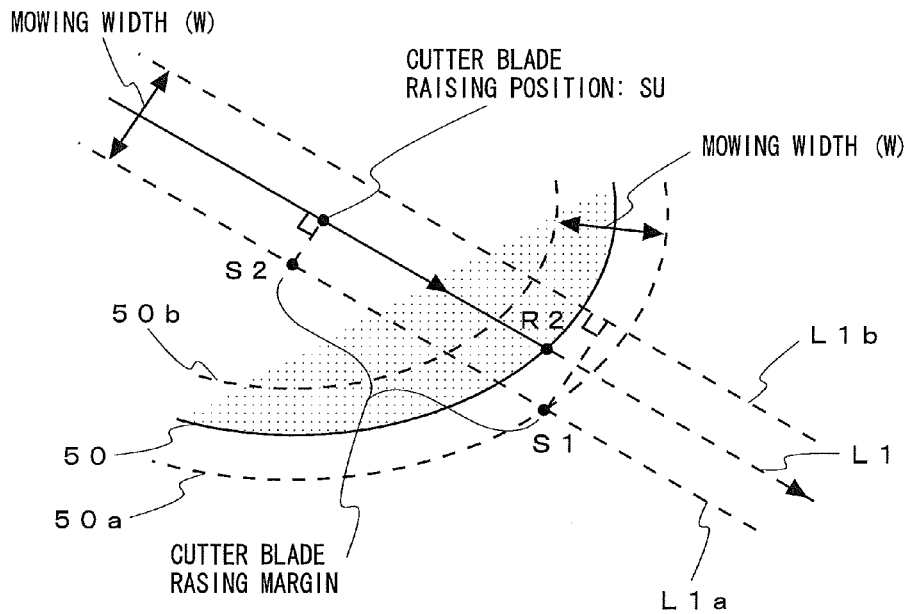
FIGS. 8A and 8B are views for use in describing an up-and-down operation of cutter blades of the motor-driven lawn mower.

Referring to FIG. 8A, the operation defining unit 111 defines sidelines L1a and L1b as well as an outer border line 50a and an inner border line 50b. The sidelines L1a and L1b are located on both sides of the straight service path L1 in a parallel relation with it and are away from the straight service path L1 by a distance equal to the amount W/2. Thus, the distance between the sidelines L1a and L1b is equal to the mowing width W. The outer and inner border lines 50a and 50b are defined so that they are away from the contour service path 50 by a distance equal to the amount W/2. The distance between the outer and inner border lines 50a and 50b is equal to the mowing width W. The intersections between the outer border line 50a and the sidelines L1a and L1b are calculated, respectively. According to the calculation result, the intersection that is the closer to the coordinate point R2 is selected.

In the example shown in FIG. 8A, a coordinate point S1 is selected as the intersection for this purpose. This coordinate point S1 corresponds to a start point for a cutter blade raising margin. The cutter blade raising margin as used herein means a distance in which the operation during movement is stopped. This distance is previously determined. The cutter blade raising margin may be, for example, equal to or larger than the aforementioned distance H[m] but not larger than a value obtained by adding the width W[m] of the cutter blade 18 to the distance H[m]. This prevents the motor-driven lawn mower 1 from quitting the operation in the middle of the straight service path or prevents the motor-driven lawn mower 1 from mowing to the outside of the mowing width of the contour service path.

The operation defining unit 111 calculates a coordinate point S2 from the selected coordinate point S1. The coordinate point S2 is on one sideline L1a of the straight service path L1 and is away from the coordinate point S1 in the inward direction of the contour service path 50. The operation defining unit 111 then calculates an intersection between the straight service path L1 and a normal line extending from the coordinate point S2 toward the straight service path L1. The calculated intersection is defined as a cutter blade raising position SU. In this way, the motor-driven lawn mower 1 is controlled to raise the cutter blades when it reaches the cutter blade raising position SU.

Figure 8B:
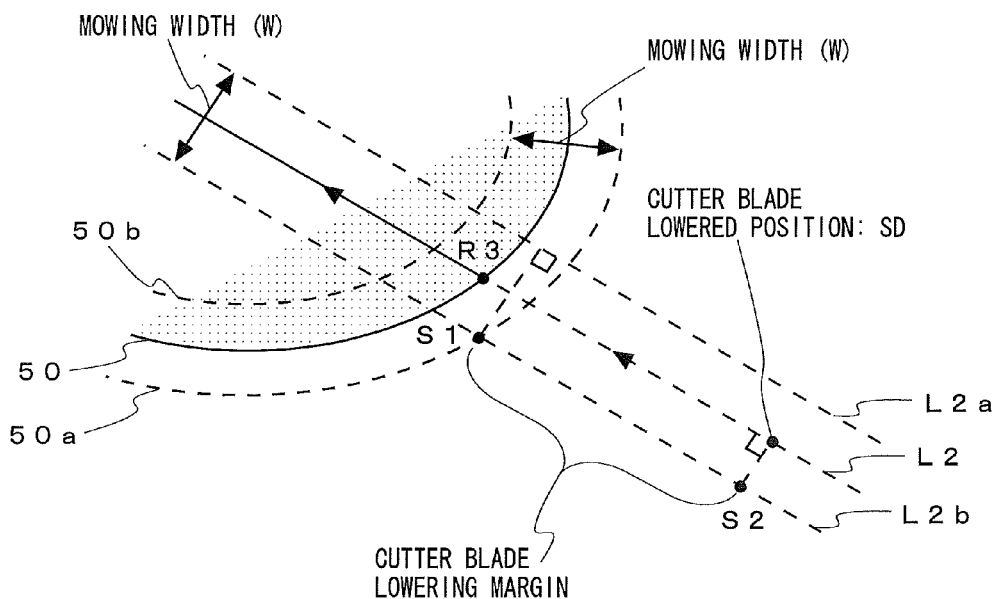

The operation defining unit 111 also defines a cutter blade lowering position. As shown in FIG. 8B, the operation defining unit 111 calculates intersections between the outer border line 50a and each of sidelines L2a and L2b. The sidelines L2a and L2b are located on both sides of the straight service path L2 in a parallel relation with it and are away from the straight service path L2 by a distance equal to the amount W/2. The outer border line 50a is similar to the contour service path 50. In other words, a sector whose arc coincides with the contour service path 50 is congruent with a sector whose arc coincides with the outer border line 50a by enlarging the former sector in the outward direction by a distance equal to the amount W/2. The intersection that is the closer to the coordinate point R3 is selected. The selected intersection is at the coordinate point S1 and corresponds to a start point for a cutter blade lowering margin. The cutter blade lowering margin as used herein is a predetermined value and may be, for example, equal to or larger than a value obtained by subtracting the width W[m] of the cutter blade 18 from the distance H[m] but not larger than the distance H[m].

This prevents the motor-driven lawn mower 1 from mowing from the outside of the mowing width of the contour service path or prevents the motor-driven lawn mower 1 from starting the operation in the middle of the straight service path.

The operation defining unit 111 calculates the coordinate point S2 from the coordinate point S1. The coordinate point S2 is on the sideline L2b and is away from the coordinate point S1 in the outward direction of the contour service path 50 by a distance equivalent to the cutter blade lowering margin. The operation defining unit 111 then calculates an intersection between the straight service path L2 and a normal line extending from the coordinate point S2 toward the extended line from the straight service path L2. The calculated intersection is defined as a cutter blade lowered position SD. In this way, the motor-driven lawn mower 1 is controlled to lower the cutter blades when it reaches the cutter blade lowered position SD and restarts the lawn mowing.

Next, the bridge line path is described. The term "bridge line path" herein refers to, for example, a traveling path that the motor-driven lawn mower 1 follows from a position (e.g., a garage or a golf course mowed just previously) where the motor-driven lawn mower 1 stands to a position on a certain straight service path from which the motor-driven lawn mower 1 begins lawn mowing, a traveling path from a position at the end of the last straight service path to a start position at which lawn mowing along the contour service path is started, or a traveling path from a position at the end of the contour service path to any other position (e.g., a garage or a golf course to be mowed subsequently).

Now, how the service path defining unit 109 generates the bridge line path is described with reference to FIGS. 9A, 9B and FIG. 10.

Figure 9A:
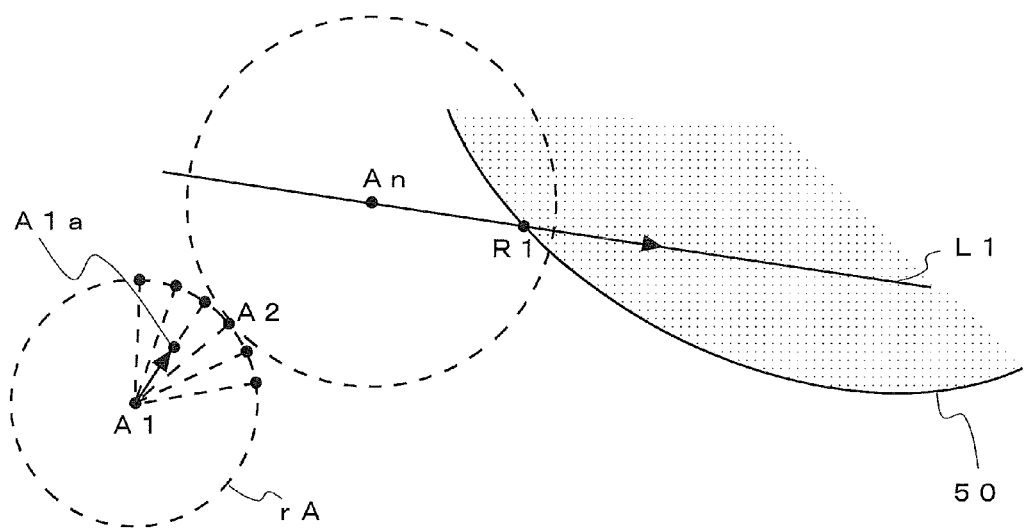
FIGS. 9A and 9B are views illustrating how to define a bridge line path when the motor-driven lawn mower moves from a start point to a first straight service path.
Figure 9B:
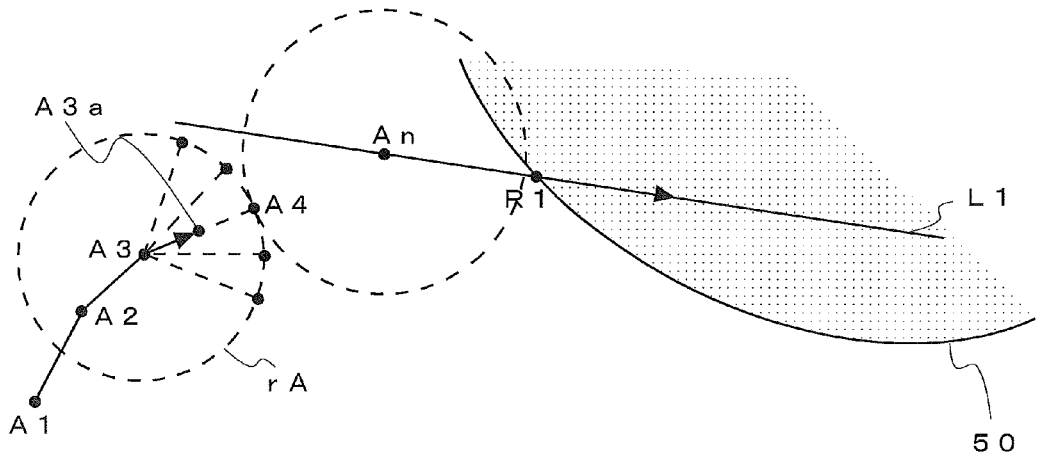

FIGS. 9A and 9B show an example of how the service path defining unit 109 defines a bridge line path to a destination point An. In this example, the service path defining unit defines a circle rA whose center is at a current stay position A1 of the motor-driven lawn mower 1 and whose radius is equal to n (n is a natural number) times the length from the current stay position A1 to a check position after the motor-driven lawn mower 1 has traveled a predetermined distance, selecting a position on the periphery of the circle rA that is closest to the destination point An, the position corresponding to an intersection between the periphery of the circle rA and a line segment connecting the current stay position A1 to the check position, redefining the circle rA with this position used as a new stay position A2, and repeating these operations until the new stay position gets close to the destination point An.

The destination point An is defined so that the motor-driven lawnmower 1 can start mowing from the intersection R1 between the contour service path 50 and the straight service path L1 according to the slope of the straight service path L1.

The service path defining unit 109 first determines a line path from the point A1 to the destination point An in the following manner. The service path defining unit 109 draws a circle rA whose center is at the point A1 and whose radius is equal to the double the predetermined distance from the point A1 to a point A1a in the advancing (radially outward) direction. As shown in the figure, a vector (A1, A1a) is provided along the radius of the circle rA. Line segments, each of which has a length that is equal to or larger than the double of the vector, are extended from the point A1 so that they are radial and equally spaced at a predetermined angle (e.g., 10 degrees). Among intersections between these line segments and the periphery of the circle rA, the service path defining unit 109 selects a single intersection that is positioned on the line connecting the point A1 and the destination point An. In other words, the service path defining unit 109 selects such coordinate point on the periphery of the circle rA that is closest to the destination point An. In the example shown in FIG. 9A, a point A2 is selected. The points A1 and A2 are both coordinate points on the bridge line path. The distance between the points A1 and A2 corresponds to the radius of the circle rA. Subsequently, the service path defining unit 109 draws the circle rA whose center is at the point A1a and whose radius is equal to the one described above. Line segments, each of which has a length that is equal to or larger than the double of a vector (A1a, A2), are extended from the point A1a so that they are radial and equally spaced at a predetermined angle (e.g., 10 degrees). Among intersections between these line segments and the periphery of the circle rA, the service path defining unit 109 selects a single intersection that is positioned on the line connecting the point A1a and the destination point An. Similar operations are repeated.

FIG. 9B schematically shows a result after the aforementioned operation is repeated four times. The points A1, A2, and A3 are already selected as the coordinate points (positions) on the bridge line path for the motor-driven lawn mower 1. In the example shown in FIG. 9B, the service path defining unit 109 draws the circle rA whose center is at the point A3 and whose radius is equal to the one described above. Line segments, each of which has a length that is equal to or larger than the double of a vector (A3, A3a), are extended from the point A3 so that they are radial and equally spaced at a predetermined angle (e.g., 10 degrees). Among intersections between these line segments and the periphery of the circle rA, the service path defining unit 109 selects a coordinate point A4 that is positioned on the line connecting the point A3 and the destination point An. This operation is repeated until the distance between a selected coordinate point and the destination point An becomes equal to one half of the radius of the circle rA.

In this way, the selected coordinate points including the point A1 and the destination point An are connected in series. This provides the bridge line path from the position A1 where the motor-driven lawn mower 1 stands to the destination point An as well as the work start position R1.

A similar process can be used to generate a bridge line path from the work end position of the contour service path to a given point. For example, the aforementioned coordinate point R1 is defined as the work end position and the given point is defined as the aforementioned point A1 to repeat the operation described above.

Figure 10:
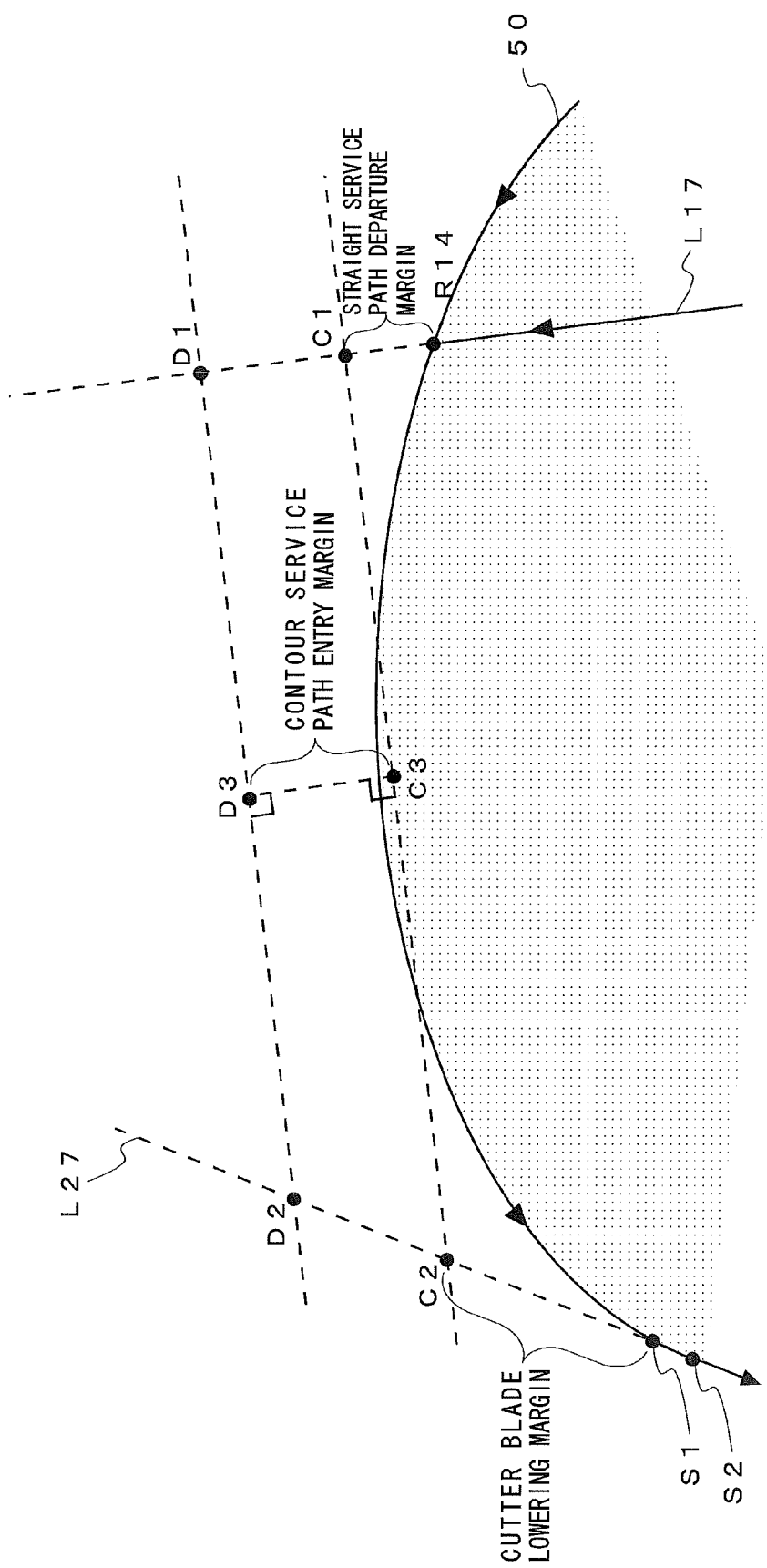
FIG. 10 is a view illustrating how to define a bridge line path when the motor-driven lawn mower moves from a straight service path to a contour service path.

FIG. 10 shows how a bridge line path is generated between a position at which mowing of all straight service paths is completed and a work start position of the contour service path.

The service path defining unit 109 determines a position C1 on the extended line from a straight service path L17, from a work end position R14 on the straight service path L17. The position C1 is away from the work end position by an amount equal to the straight service path departure margin. The straight service path departure margin is defined to be equal to the total length [m] of the body of the motor-driven lawn mower 1 in order to prevent the motor-driven lawn mower 1 from starting the turning in an area enclosed by the contour service path 50.

In addition, a position C2 is determined on an extended line L27 extending outward from the contour service path 50. The position C2 is away from the work start position S1 by a distance equal to the cutter blade lowering margin with a slope of a straight line connecting the work start position S1 on the contour service path 50 and a subsequent work position S2 on the contour service path 50. In addition, positions D3 and D2 are determined. The position D3 is away from a position C3 (the midpoint of the line segment connecting the positions C1 and C2) by a distance equal to a contour service path entry margin on the normal line that is perpendicular to the line connecting the positions C1 and C2. Then, the positions D1 and D2 are determined. The position D1 is at the intersection between the extended line from the straight service path L17 and a straight line that passes through the position D3 and is parallel to a line segment connecting the position C1 and the position C2. The position D2 is at the intersection between the extended line L27 and the straight line that passes through the position D3 and is parallel to the line segment connecting the position C1 and the position C2. The contour service path entry margin has a predetermined length for the purpose of providing an entry angle that is not steep when the motor-driven lawn mower 1 begins lawn mowing along the contour service path. As a result, it is possible to define a bridge line path through which the motor-driven lawn mower 1 that has passed through the work end position R14 via the straight service path L17 travels to the work start position S1 on the contour service path 50 after passing through the positions D1, D3, and D2 in this order.

As described above, in the controller 10 in this embodiment, the contour service path 50 and a plurality of straight service paths are defined for a target area, based on the behavior of the motor-driven lawn mower 1 that is detected by the vehicle speed sensor 11 and the yaw rate sensor 12, the current position of the motor-driven lawn mower 1 that is detected by the GPS antenna 15 and the GPS receiving unit 101, and information about their changes. In addition, among a plurality of straight service paths, the intersections are determined between the contour service path 50 and a pair of straight service paths L1 and L2 that are adjacent to each other and through which the motor-driven lawn mower 1 travels in the opposite directions. The turning behavior, including the backward movement of the work machine, connecting the determined adjacent intersections is set (recorded) in the configuration file. The recorded information in this configuration file is read during the operation in order to move the motor-driven lawn mower 1 along the contour service path 50 and the straight service paths L1 and L2 as long as the motor-driven lawn mower 1 is not at the aforementioned intersections. When the motor-driven lawn mower 1 reaches any one of the intersections, the travel control signal is produced in order to turn the motor-driven lawn mower 1 as defined. This travel control signal is used to control the travel drive mechanism. Accordingly, the motor-driven lawn mower 1 can be moved in the target area through a minimum path while keeping flexibility in steering and in target area to be mowed. As a result, operation time can be reduced and energy efficiency can be improved as compared with conventional motor-driven lawn mowers.

In addition, aforementioned various defining functions allows automatic lawn mowing by means of performing a previous test drive of the motor-driven lawn mower 1 on the target area and sets the traveling paths in the configuration file based on the behavior, current position, and information about their changes and using the information read from the configuration file in the actual lawn mowing. Therefore, lawn mowing can be done even in a night time without any driver.

In addition, in this embodiment, the turn defining unit 110 can selectively define at least one of the right-to-left switch back behavior, the right-to-left reverse switch back behavior, and the right-to-left polarized turn, based on the attribute information including body size of the motor-driven lawn mower 1, the work width, and a shape of a curved line path followed by the motor-driven lawn mower 1 when it turns. Accordingly, the turning behavior can be determined arbitrarily depending on the geographical features, presence or absence of an obstacle, and tilt in an area outside the target area to be mowed. This improves the flexibility of the operation.

In particular, the curved line path followed by the motor-driven lawn mower 1 when it turns has a shape of an arc of one quarter of a circle with a minimum turning radius with which the motor-driven lawn mower 1 can turn. Handling can be improved because the motor-driven lawn mower 1 can turn through a minimum path only by means of rotating a wheel fully in a right or left direction.

In this embodiment, the service path defining unit 109 defines the bridge line path shown in FIG. 9 or FIG. 10, which provides easy direction of the motor-driven lawn mower 1 to the work start position in the subsequent target area. In addition, the contour service path 50, the straight service paths such as L1 and L2, and the bridge line path(s) are previously associated with a map of the target area and are recorded in the configuration file. The travel control signal is produced at the beginning of the operation in the target area according to the recorded information read from the configuration file and the current position obtained by the GPS receiving unit 101. This makes it possible to easily provide the self-propelled motor-driven lawn mower 1.

The controller 10 according to this embodiment produces the work control signal and controls the work drive mechanism included in the motor-driven lawn mower 1 by using the work control signal in which the work control signal is for use in quitting, by an amount equal to a predetermined margin size, the operation before beginning and completion of the turning behavior defined by the turn defining unit 110. It is possible to effectively prevent lawns from being mowed too short or avoid any patches of grass left unmowed.

By providing the aforementioned controller 10 as well as the drive mechanism capable of moving and operating the motor-driven lawn mower according to the travel control signal and the work control signal, it is possible to provide the motor-driven lawn mower 1 with a significantly higher operation efficiency. In particular, the controller 10 previously associates the contour service path 50, the straight service paths such as L1 and L2, and the bridge line path(s) with a map of the target area and records them in the configuration file. The controller 10 produces the travel control signal at the beginning of the operation in the target area according to the recorded information read from the configuration file and the current position obtained from the GPS receiving unit 101 to allow self-propelled operations. The motor-driven lawn mower 1 with good handling is achieved with which lawn mowing can be done even in a night time.

<Modified Version>

While the present embodiment is as described above, the present invention is not limited to the aforementioned embodiment. Instead, various modifications may be made.

For example, a work map may be recorded in the map information recording unit 103 based on the geographical features and attribute information including the body size of the motor-driven lawn mower 1 previously measured, the work width, and a shape of a curved line path followed by the motor-driven lawn mower 1 when it turns. The motor-driven lawn mower 1 may be moved and operated according this work map. In this way, it is possible to operate the motor-driven lawn mower without setting the contour service path 50.

Alternatively, the GPS antenna 15 may be provided at two or more positions with equal intervals in a right-and-left or front-and-back direction from the measured center of the position of a body frame of the motor-driven lawn mower 1 to correct the position information depending on the tilt or slope.

This configuration improves accuracy of travel. Even when a certain GPS antenna fails to receive radio waves due to, for example, trees, buildings, or some other geographical features, the remaining GPS antennas can receive the radio waves, so that the GPS ensures to provide location to achieve lawn mowing with higher accuracy.

The controller 10 according to this embodiment can be mounted on an agricultural machine or work machine other than the motor-driven lawn mower 1.

What is claimed is:

1. A work machine controller comprising:
a detection unit configured to detect a behavior and a current position of a work machine that achieves a predetermined operation while moving a target area;
a service path defining unit configured to define a contour service path and a plurality of straight service paths, the contour service path running along the periphery of the target area, the straight service paths being defined by dividing the target area enclosed by the contour service path into two or more blocks with straight lines;
a turning behavior defining unit configured to determine intersections between the contour service path and a pair of straight service paths, the pair of straight service paths being adjacent two of the straight service paths, the work machine being designed to travel along one of the pair of straight service paths in a first direction and travel along the other of the pair of straight service paths in a second direction that is opposite to the first direction, the turning behavior defining unit defining a turning behavior including backward movement of the work machine along a path connecting the adjacent intersections; and
a control unit configured to produce a travel control signal to control a travel drive mechanism included in the work machine by using the travel control signal, the travel control signal being used to move the work machine along the contour service path and the straight service paths defined by the service path defining unit on anywhere other than the intersections between the contour service path and the straight service paths, based on the behavior and current position of the work machine traveling in the target area and information about their changes, and to turn the work machine in accordance with the turning behavior defined by the turning behavior defining unit when the work machine reaches one of the intersections,
wherein the turning behavior defining unit is adapted to define at least one of first, second, and third turning behaviors, based on geographical features and attribute information including the body size of the work machine, a work width, and a shape of a curved line path followed by the work machine when it turns,
the first turning behavior being for allowing the work machine to turn from one straight service path to another straight service path in such a manner that the work machine travels along a first straight service path that is one of the pair of straight service paths, passes through an intersection between the first straight service path and the contour service path, moves and turns ahead toward an extended line from a second straight service path which is another straight service path, moves straight back from an intersection with the extended line from the second straight service path until the work machine reaches an extended line from the first straight service path, and then moves and turns ahead toward an intersection between the second straight service path and the contour service path;
the second turning behavior being for allowing the work machine to turn from one straight service path to another straight service path in such a manner that the work machine travels along the first straight service path, passes through the intersection between the first straight service path and the contour service path, moves ahead by a predetermined distance on the extended line from the first straight service path, moves and turns back toward the extended line from the second straight service path, moves straight ahead from the intersection with the extended line from the second straight service path until the work machine reaches the extended line from the first straight service path, and then turns back toward the extended line from the second straight service path; and
the third turning behavior being for allowing the work machine to turn from one straight service path to another straight service path in such a manner that the work machine travels the first straight service path, passes through the intersection between the first straight service path and the contour service path, moves and turns ahead in the direction opposite to the second straight service path, stops temporarily, moves straight back to the intersection with the extended line from the first straight service path, and turns back toward the extended line from the second straight service path.

2. The work machine controller as claimed in claim 1, wherein a curved line path followed by the work machine when it turns is an arc of one quarter of a circle having a minimum turning radius with which the work machine can turn.

3. The work machine controller as claimed in claim 1, wherein the service path defining unit defines a bridge line path to a destination point by defining, in addition to the contour service path and the straight service paths, a circle whose center is at a current stay position of the work machine and whose radius is equal to n (n is a natural number) times the length from the current stay position to a check position after the work machine has traveled a predetermined distance, selecting a position on the periphery of the circle that is closest to the destination point, the position corresponding to an intersection between the periphery of the circle and a line segment connecting the current stay position to the check position, redefining the circle with this position used as a new stay position, and repeating these operations until the new stay position gets close to the destination point.

4. The work machine controller as claimed in claim 3, wherein the destination point is at a position where the work machine is away from one of the straight service paths in the direction outward of the target area by an amount that is equal to the minimum turning radius with which the work machine can turn, the destination point being at a position at which the work machine can begin the operation.

5. The work machine controller as claimed in claim 4, wherein the service path defining unit is configured to define a bridge line path by determining a first position (C1) on an extended line from a straight service path (L17), from a work end position (R14) on the straight service path (L17), the first position (C1) being away from the work end position by an amount equal to a straight service path departure margin, determining a second position (C2) on an extended line (L27) extending outward from the contour service path with a slope of a straight line connecting the work start position (S1) on the contour service path and a subsequent work position (S2) on the contour service path, the second position (C2) being away from the work start position (S1) by a distance equal to a cutter blade lowering margin, and determining a fourth position (D3), a fifth position (D1) and a sixth position (D2), the fourth position (D3) being away from a third position (C3) by a distance equal to a contour service path entry margin on the normal line that is perpendicular to the line connecting the first position (C1) and the second position (C2), the third position (C3) being the midpoint of a line segment connecting the first position (C1) and the second position (C2), the fifth position (D1) being at an intersection between the extended line from the straight service path (L17) and a straight line that passes through the fourth position (D3) and is parallel to a line segment connecting the first position (C1) and the second position (C2), the sixth position (D2) being at an intersection between the extended line (L27) and the straight line that passes through the fourth position (D3) and is parallel to the line segment connecting the first position (C1) and the second position (C2), the bridge line path being a path through which the work machine that has passed through the work end position (R14) via the straight service path (L17) travels to the work start position (S1) on the contour service path after passing through the fifth position (D1), the fourth position (D3), and the sixth position (D2) in this order.

6. The work machine controller as claimed in claim 3, wherein the control unit records the contour service path, the straight service paths, and the bridge line path in a predetermined memory with these paths being associated with a map of the target area, and produces the travel control signal according to the current position and the information recorded in and read from the memory at the beginning of the operation in the target area.

7. The work machine controller as claimed in claim 1, wherein the control unit produces a work control signal and controls a work drive mechanism included in the work machine by using the work control signal, the work control signal being for use in quitting, by an amount equal to a predetermined margin size, the operation before beginning and completion of the turning behavior defined by the turning behavior defining unit.

8. A work machine that achieves a predetermined operation while moving a target area comprising a controller, the controller having:
   a detection unit configured to detect a behavior and a current position of the work machine;
   a service path defining unit configured to define a contour service path and a plurality of straight service paths, the contour service path running along the periphery of the target area, the straight service paths being defined by dividing the target area enclosed by the contour service path into two or more blocks with straight lines;
   a turning behavior defining unit configured to determine intersections between the contour service path and a pair of straight service paths, the pair of straight service paths being adjacent two of the straight service paths, the work machine being designed to travel along one of the pair of straight service paths in a first direction and travel along the other of the pair of straight service paths in a second direction that is opposite to the first direction, the turning behavior defining unit defining a turning behavior including backward movement of the work machine along a path connecting the adjacent intersections; and
   a control unit configured to produce a travel control signal for traveling along the contour service path and the straight service paths defined by the service path defining unit on anywhere other than the intersections between the contour service path and the straight service paths, based on the behavior and current position detected by the detection unit and information about their changes, and turning in accordance with the turning behavior defined by the turning behavior defining unit when the work machine reaches one of the intersections;
   the work machine further comprising a drive mechanism that is adapted to drive itself in response to the travel control signal produced from the controller,
   wherein the turning behavior defining unit is adapted to define at least one of first, second, and third turning behaviors, based on geographical features and attribute information including the body size of the work machine, a work width, and a shape of a curved line path followed by the work machine when it turns,
   the first turning behavior being for allowing the work machine to turn from one straight service path to another straight service path in such a manner that the work machine travels along a first straight service path that is one of the pair of straight service paths, passes through an intersection between the first straight service path and the contour service path, moves and turns ahead toward an extended line from a second straight service path which is another straight service path, moves straight back from an intersection with the extended line from the second straight service path until the work machine reaches an extended line from the first straight service path, and then moves and turns ahead toward an intersection between the second straight service path and the contour service path;
   the second turning behavior being for allowing the work machine to turn from one straight service path to another straight service path in such a manner that the work machine travels along the first straight service path, passes through the intersection between the first straight service path and the contour service path, moves ahead by a predetermined distance on the extended line from the first straight service path, moves and turns back toward the extended line from the second straight service path, moves straight ahead from the intersection with the extended line from the second straight service path until the work machine reaches the extended line from the first straight service path, and then turns back toward the extended line from the second straight service path; and
   the third turning behavior being for allowing the work machine to turn from one straight service path to another straight service path in such a manner that the work machine travels the first straight service path, passes through the intersection between the first straight service path and the contour service path, moves and turns ahead in the direction opposite to the second straight service path, stops temporarily, moves straight back to the intersection with the extended line from the first straight service path, and turns back toward the extended line from the second straight service path.

9. The work machine as claimed in claim 8, wherein the controller records the contour service path, the straight service paths, and the bridge line path in a predetermined memory with these paths being associated with a map of the target area, and produces the travel control signal according to the current position and the information recorded on and read from the memory at the beginning of the operation in the target area, thereby allowing a self-propelled operation of the work machine.

10. A computer system mounted on a work machine, the computer system including a computer program for causing the computer to include a controller, that achieves a predetermined operation while moving a target area, the computer program being adapted to make the computer system function as:

a detection unit configured to detect a behavior and a current position of the work machine;

a service path defining unit configured to define a contour service path and a plurality of straight service paths, the contour service path running along the periphery of the target area, the straight service paths being defined by dividing the target area enclosed by the contour service path into two or more blocks with straight lines;

a turning behavior defining unit configured to determine intersections between the contour service path and a pair of straight service paths, the pair of straight service paths being adjacent two of the straight service paths, the work machine being designed to travel along one of the pair of straight service paths in a first direction and travel along the other of the pair of straight service paths in a second direction that is opposite to the first direction, the turning behavior defining unit defining a turning behavior including backward movement of the work machine along a path connecting the adjacent intersections; and a control unit configured to produce a travel control signal to control a travel drive mechanism included in the work machine by using the travel control signal, the travel control signal being used to move the work machine along the contour service path and the straight service paths defined by the service path defining unit on anywhere other than the intersections between the contour service path and the straight service paths, based on the behavior and current position of the work machine traveling in the target area and information about their changes, and to turn the work machine in accordance with the turning behavior defined by the turning behavior defining unit when the work machine reaches one of the intersections, wherein the turning behavior defining unit is adapted to define at least one of first, second, and third turning behaviors, based on geographical features and attribute information including the body size of the work machine, a work width, and a shape of a curved line path followed by the work machine when it turns, the first turning behavior being for allowing the work machine to turn from one straight service path to another straight service path in such a manner that the work machine travels along a first straight service path that is one of the pair of straight service paths, passes through an intersection between the first straight service path and the contour service path, moves and turns ahead toward an extended line from a second straight service path which is another straight service path, moves straight back from an intersection with the extended line from the second straight service path until the work machine reaches an extended line from the first straight service path, and then moves and turns ahead toward an intersection between the second straight service path and the contour service path;

the second turning behavior being for allowing the work machine to turn from one straight service path to another straight service path in such a manner that the work machine travels along the first straight service path, passes through the intersection between the first straight service path and the contour service path, moves ahead by a predetermined distance on the extended line from the first straight service path, moves and turns back toward the extended line from the second straight service path, moves straight ahead from the intersection with the extended line from the second straight service path until the work machine reaches the extended line from the first straight service path, and then turns back toward the extended line from the second straight service path; and the third turning behavior being for allowing the work machine to turn from one straight service path to another straight service path in such a manner that the work machine travels the first straight service path, passes through the intersection between the first straight service path and the contour service path, moves and turns ahead in the direction opposite to the second straight service path, stops temporarily, moves straight back to the intersection with the extended line from the first straight service path, and turns back toward the extended line from the second straight service path.

11. A work machine controller comprising:

a detection unit configured to detect a behavior and a current position of a work machine that achieves a predetermined operation while moving a target area;

a service path defining unit configured to define a contour service path and a plurality of straight service paths, the contour service path running along the periphery of the target area, the straight service paths being defined by dividing the target area enclosed by the contour service path into two or more blocks with straight lines;

a turning behavior defining unit configured to determine intersections between the contour service path and a pair of straight service paths, the pair of straight service paths being adjacent two of the straight service paths, the work machine being designed to travel along one of the pair of straight service paths in a first direction and travel along the other of the pair of straight service paths in a second direction that is opposite to the first direction, the turning behavior defining unit defining a turning behavior including backward movement of the work machine along a path connecting the adjacent intersections; and a control unit configured to produce a travel control signal to control a travel drive mechanism included in the work machine by using the travel control signal, the travel control signal being used to move the work machine along the contour service path and the straight service paths defined by the service path defining unit on anywhere other than the intersections between the contour service path and the straight service paths, based on the behavior and current position of the work machine traveling in the target area and information about their changes, and to turn the work machine in accordance with the turning behavior defined by the turning behavior defining unit when the work machine reaches one of the intersections, wherein the service path defining unit defines a bridge line path to a destination point by defining, in addition to the contour service path and the straight service paths, a circle whose center is at a current stay position of the work machine and whose radius is equal to n (n is a natural number) times the length from the current stay position to a check position after the work machine has traveled a predetermined distance, selecting a position on the periphery of the circle that is closest to the destination point, the position corresponding to an intersection between the periphery of the circle and a line segment connecting the current stay position to the check position, redefining the circle with this position used as a new stay position, and repeating these operations until the new stay position gets close to the destination point.

12. A work machine that achieves a predetermined operation while moving a target area comprising a controller, the controller having:

a detection unit configured to detect a behavior and a current position of the work machine;

a service path defining unit configured to define a contour service path and a plurality of straight service paths, the contour service path running along the periphery of the target area, the straight service paths being defined by dividing the target area enclosed by the contour service path into two or more blocks with straight lines;

a turning behavior defining unit configured to determine intersections between the contour service path and a pair of straight service paths, the pair of straight service paths being adjacent two of the straight service paths, the work machine being designed to travel along one of the pair of straight service paths in a first direction and travel along the other of the pair of straight service paths in a second direction that is opposite to the first direction, the turning behavior defining unit defining a turning behavior including backward movement of the work machine along a path connecting the adjacent intersections; and a control unit configured to produce a travel control signal for traveling along the contour service path and the straight service paths defined by the service path defining unit on anywhere other than the intersections between the contour service path and the straight service paths, based on the behavior and current position detected by the detection unit and information about their changes, and turning in accordance with the turning behavior defined by the turning behavior defining unit when the work machine reaches one of the intersections;

the work machine further comprising a drive mechanism that is adapted to drive itself in response to the travel control signal produced from the controller, wherein the service path defining unit defines a bridge line path to a destination point by defining, in addition to the contour service path and the straight service paths, a circle whose center is at a current stay position of the work machine and whose radius is equal to n (n is a natural number) times the length from the current stay position to a check position after the work machine has traveled a predetermined distance, selecting a position on the periphery of the circle that is closest to the destination point, the position corresponding to an intersection between the periphery of the circle and a line segment connecting the current stay position to the check position, redefining the circle with this position used as a new stay position, and repeating these operations until the new stay position gets close to the destination point.

13. A computer system mounted on a work machine, the computer system including a computer program for causing the computer to include a controller, that achieves a predetermined operation while moving a target area, the computer program being adapted to make the computer system function as:

a detection unit configured to detect a behavior and a current position of the work machine;

a service path defining unit configured to define a contour service path and a plurality of straight service paths, the contour service path running along the periphery of the target area, the straight service paths being defined by dividing the target area enclosed by the contour service path into two or more blocks with straight lines;

a turning behavior defining unit configured to determine intersections between the contour service path and a pair of straight service paths, the pair of straight service paths being adjacent two of the straight service paths, the work machine being designed to travel along one of the pair of straight service paths in a first direction and travel along the other of the pair of straight service paths in a second direction that is opposite to the first direction, the turning behavior defining unit defining a turning behavior including backward movement of the work machine along a path connecting the adjacent intersections; and a control unit configured to produce a travel control signal for traveling along the contour service path and the straight service paths defined by the service path defining unit on anywhere other than the intersections between the contour service path and the straight service paths, based on the behavior and current position detected by the detection unit and information about their changes, and turning in accordance with the turning behavior defined by the turning behavior defining unit when the work machine reaches one of the intersections;

the work machine further comprising a drive mechanism that is adapted to drive itself in response to the travel control signal produced from the controller, wherein the service path defining unit defines a bridge line path to a destination point by defining, in addition to the contour service path and the straight service paths, a circle whose center is at a current stay position of the work machine and whose radius is equal to n (n is a natural number) times the length from the current stay position to a check position after the work machine has traveled a predetermined distance, selecting a position on the periphery of the circle that is closest to the destination point, the position corresponding to an intersection between the periphery of the circle and a line segment connecting the current stay position to the check position, redefining the circle with this position used as a new stay position, and repeating these operations until the new stay position gets close to the destination point.

* * * * *